(12) United States Patent  (10) Patent No.: US 9,123,943 B1
Anderson et al.  (45) Date of Patent: Sep. 1, 2015

(54) SYNTHESIS OF ELECTROACTIVE IONIC LIQUIDS FOR FLOW BATTERY APPLICATIONS

(75) Inventors: Travis Mark Anderson, Albuquerque, NM (US); David Ingersoll, Albuquerque, NM (US); Chad Staiger, Albuquerque, NM (US); Harry Pratt, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 528 days.

(21) Appl. No.: 13/565,619

(22) Filed: Aug. 2, 2012

Related U.S. Application Data

(60) Provisional application No. 61/515,204, filed on Aug. 4, 2011.

(51) Int. Cl.
   *H01M 8/18* (2006.01)
   *H01M 4/36* (2006.01)
   *H01M 8/20* (2006.01)

(52) U.S. Cl.
   CPC .............. H01M 8/188 (2013.01); H01M 4/364 (2013.01); H01M 8/20 (2013.01)

(58) Field of Classification Search
   CPC .................................................... H01M 8/188
   USPC ................................................. 429/70, 105
   See application file for complete search history.

(56) References Cited

U.S. PATENT DOCUMENTS 7,537,859 B2   5/2009   Samuel et al.
7,820,321 B2   10/2010  Horne et al.
2005/0158615 A1* 7/2005   Samuel et al. ............... 429/81
2008/0146849 A1   6/2008   Dai et al.
2008/0274385 A1* 11/2008   Creeth ........................ 429/19
2011/0195283 A1   8/2011   Sun et al.
2012/0115069 A1   5/2012   Noack et al.

OTHER PUBLICATIONS

Wen et al. A study of the Fe(III)/Fe(II)-triethanolamine complex redox couple for redox flow battery application. Electro. Acta, vol. 51, 2006, pp. 3769-3775 [online], [retrieved on Mar. 31, 2015]. Retrieved from the Internet <URL: http://www.sciencedirect.com/science/article/pii/S0013468605012764>.*

Olivier-Bourbigou et al. Ionic liquids: perspectives for organic and catalytic reactions. J. Mol. Cat. A: Chem., vol. 182-183, 2002, pp. 419-437 [online], [retrieved on Mar. 31, 2015]. Retrieved from the Internet <URL: http://www.sciencedirect.com/science/article/pii/S1381116901004654>.*

Davies et al. Complexes of the cupric ion with mono-, di-, and tri-ethanolamine. J. Chem. Soc. (A), 1968, pp. 1824-1828 [online], [retrieved on Mar. 31, 2015]. Retrieved from the Internet <URL: http://pubs.rsc.org/en/Content/ArticleLanding/1968/J1/J19680001824#!divAbstract>.*

Kokozay et al. Direct synthesis of heterometallic complexes. Transition Metal Chemistry, vol. 27, 2002, pp. 693-699 [online], [retrieved Jun. 21, 2015]. Retrieved from the internet <URL: http://link.springer.com/article/10.1023/A:1020342421296#>.*

(Continued)

*Primary Examiner* — Jonathan G Leong
*Assistant Examiner* — James Erwin
(74) *Attorney, Agent, or Firm* — Michael A. Beckett

(57) ABSTRACT

The present disclosure is directed to synthesizing metal ionic liquids with transition metal coordination cations, where such metal ionic liquids can be used in a flow battery. A cation of a metal ionic liquid includes a transition metal and a ligand coordinated to the transition metal.

9 Claims, 21 Drawing Sheets

(56) References Cited

OTHER PUBLICATIONS

Thomas, et al., "Ferrocenyl imidazolium salts as a new class of anion receptors with C—H—X-hydrogen bonding", Tetrahedron Letters 41, 2000, pp. 413-416.

Gao, et al., "The First (Ferrocenylmethyl)imidazolium and (Ferrocenylmethyl)triazolium Room Temperature Ionic Liquids", Inorg. Chem., 2004, 43, pp. 3406-3412.

Balasubramanian, et al., "Redox Ionic Liquid Phases: Ferrocentated Imidazoliums", J. Am. Chem. Soc., 2006, 128, pp. 9994-9995.

Huang, et al., "A New Strategy for Synthesis of Novel Classes of Room-Temperature Ionic Liquids Based on Complexation Reaction of Cations", Journal of The Electrochemical Society, 2006, 153, pp. J9-J13.

Wang, et al., "Electron Transport and Counterion Relaxation Dynamics in Neat Ferrocenated Imidazolium Ionic Liquids", J. Phys. Chem. C. 2008, 112, pp. 18207-18216.

Anderson, et al., "Synthesis of an ionic liquid with an iron coordination cation", The Royal Society of Chemistry, Dalton Trans, 2010, 39, pp. 8609-8612.

Brooks, et al., "Copper(I)-Containing Ionic Liquids for High-Rate Electrodeposition", Chem. Eur. J., 2011, 17, pp. 5054-5059.

Schaltin, et al., "Electrodeposition from Cationic Cuprous Organic Complexes: Ionic Liquids for High Current Density Electroplating", Journal of The Electrochemical Society, 2011, 158, pp. D21-D27.

Pratt III, et al., "Synthesis and characterization of ionic liquids containing copper, manganese, or zinc coordination cations", The Royal Society of Chemistry, Dalton Trans, 2011, pp. 1-6, DOI: 10.1039c1dt10973a.

Schaltin, et al., "High current density electrodeposition from silver complex ionic liquids", Phys. Chem. Chem. Phys, 2012, 14, pp. 1706-1715.

Brooks, et al., "Heteroleptic silver-containing ionic liquids", The Royal Society of Chemistry, Dalton Trans, 2012, 41, pp. 6902-6905.

* cited by examiner

SYNTHESIS OF ELECTROACTIVE IONIC LIQUIDS FOR FLOW BATTERY APPLICATIONS

CROSS-REFERENCE TO RELATED APPLICATION

This application claims the benefit of U.S. Provisional Patent Application Ser. No. 61/515,204, filed Aug. 4, 2011, and entitled "SYNTHESIS OF ELECTROACTIVE IONIC LIQUIDS FOR FLOW BATTERY APPLICATIONS", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Global energy consumption is projected to significantly increase by mid-century, and this increased need may be partially met through use of renewable energy sources. Due to the intermittent nature of some of these renewable energy sources, such as wind and solar, it is desirable to incorporate compatible large-scale energy storage devices into the energy grid. Use of such grid storage is also being driven by the evolving nature of the grid (e.g., green grid, smart grid, distributed nature of the grid, etc.) as well as by other technological developments including vehicle electrification. Redox (reduction-oxidation) flow batteries, a rechargeable system that uses redox states of various species for charge/discharge purposes, represent a potential approach for grid storage.

In conventional flow batteries, electrolyte (e.g., catholyte and anolyte) that includes one or more dissolved electroactive species oftentimes flows through an electrochemical cell that reversibly converts chemical energy to electricity. The electroactive components are dissolved in a solvent rather than being in a solid state in such flow batteries. Additional electrolyte can be stored external to the cell (e.g., in tanks), and can be pumped through the cell or fed into the cell via gravity. Thus, spent electrolyte in the cell can be recovered for re-energization and replaced with electrolyte from the external tanks. While flow batteries may be charged and discharged without degradation of performance, conventional flow batteries commonly have low energy densities and include costly materials.

SUMMARY

Described herein are various technologies that pertain to synthesizing metal ionic liquids with transition metal coordination cations, where such metal ionic liquids can be used in a flow battery. A cation of a metal ionic liquid includes a transition metal and a ligand coordinated to the transition metal. Moreover, the ligand includes a nitrogen containing functional group and an oxygen containing functional group.

According to various embodiments, a metal ionic liquid can be synthesized by reacting a transition metal salt with a ligand. The reaction can be a single-step reaction. Moreover, the metal ionic liquid can be produced by a direct combination reaction of the transition metal salt with the ligand rather than a metathesis reaction.

In various embodiments, an anion of a metal ionic liquid can be 2-ethylhexanoate, hexafluorophosphate, triflate, triflimide, or tetrafluoroborate. Moreover, in accordance with an example, a ligand of a metal ionic liquid can include an amine functional group and a hydroxyl functional group. Further, a physiochemical property of an metal ionic liquid can be varied based on selection of the anion and/or the ligand.

Further, a flow battery can include a metal ionic liquid. Accordingly, the metal ionic liquid can be an electroactive material and a solvent of an electrolyte (e.g., catholyte, anolyte) in the flow battery. The metal ionic liquid can provide higher energy densities for the flow battery as compared to a flow battery where an electroactive material is dissolved in a solvent. Moreover, the metal ionic liquid can have negligible vapor pressure and can be non-corrosive.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
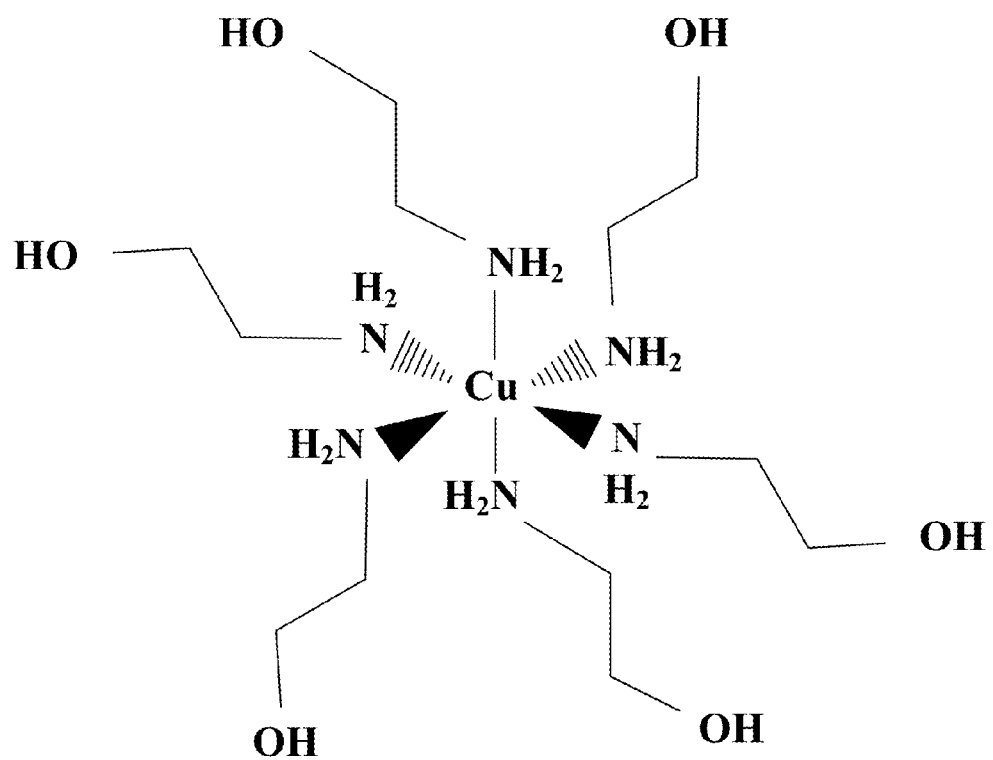
FIGS. 1-3 illustrate exemplary structural formulas of various exemplary cations in exemplary metal ionic liquids.

Various technologies pertaining to synthesizing ionic liquids with transition metal coordination cations, where such metal ionic liquids can be used in a flow battery, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Set forth herein is a family of metal ionic liquids (MetILs), which are synthesized in a single-step reaction (e.g., from low-cost precursors). The metal ionic liquids include transition metal coordination cations and weakly coordinating anions. Examples of the anions include 2-ethylhexanoate, hexafluorophosphate, triflate, triflimide, and tetrafluoroborate. The metal ionic liquids can simultaneously act as a solvent and electroactive material of a catholyte or an anolyte in a flow battery.

The transition metal-based ionic liquid can be prepared in a single-step reaction by reacting a transition metal salt with a ligand. The transition metal salt and the ligand can be combined and heated to produce the metal ionic liquid, for instance. The metal ionic liquid is produced by a direct combination reaction of the transition metal salt with the ligand as opposed to a metathesis reaction. A metathesis reaction yields a secondary product while a direct combination reaction does not yield a secondary product; accordingly, since a secondary product is not generated by a direct combination reaction, such secondary product need not be isolated and discarded when generating the metal ionic liquid (e.g., isolation may be costly and flow battery performance may be detrimentally impacted by impurities). The synthesis can be scalable and can facilitate varying physicochemical properties of the metal ionic liquid based on selection of the transition metal salt and/or the ligand.

The transition metal salt includes a transition metal and an anion. Examples of the anion include 2-ethylhexanoate, hexafluorophosphate ($PF_6^-$), triflate ($CF_3SO_3^-$), triflimide [$(CF_3SO_2)_2N^-$], and tetrafluoroborate ($BF_4^-$). Examples of the transition metal included in the transition metal salt described below include copper, iron, manganese, and zinc (e.g., copper, iron, manganese, and zinc salts); however, it is to be appreciated that the transition metal included in the transition metal salt can be cobalt, cerium, nickel, or substantially any other transition metal.

Moreover, the ligand includes a nitrogen containing functional group and an oxygen containing functional group. The nitrogen containing functional group can be an amine functional group and the oxygen containing functional group can be a hydroxyl functional group; thus, the ligand can be an amino alcohol. Examples of the ligand set forth below include ethanolamine (EA) and diethanolamine (DEA); yet, it is contemplated that substantially any other ligand that includes a nitrogen containing functional group and an oxygen containing functional group is intended to fall within the scope of the hereto appended claims. For instance, the ligand can be a straight chain ligand, a branched chain ligand, a cyclic ligand, or the like.

Examples of the metal ionic liquid include $Fe\{NH(CH_2CH_2OH)_2\}_6[CF_3SO_3]_3$, $Cu\{NH_2CH_2CH_2OH\}_6[CH_3(CH_2)_3CH(C_2H_5)CO_2]_2$, $Cu\{NH(CH_2CH_2OH)_2\}_6[CH_3(CH_2)_3CH(C_2H_5)CO_2]_2$, $Cu\{NH(CH_2CH_2OH)_2\}_6[CF_3SO_3]_2$, $Cu\{NH(CH_2CH_2OH)_2\}_6[(CF_3SO_2)_2N]_2$, $Mn\{NH(CH_2CH_2OH)_2\}_6[CF_3SO_3]_2$, and $Zn\{NH_2CH_2CH_2OH\}_6[CF_3SO_3]_2$. Other examples of the metal ionic liquid include $Ce\{NH_2CH_2CH_2OH\}_8[CF_3SO_3]_3$, $Cu\{NH(CH_2CH_2OH)_2\}_6[BF_4]_2$, $Co\{NH_2CH_2CH_2OH\}_6[CF_3SO_3]_2$, and $Ni\{NH_2CH_2CH_2OH_2\}_8[CF_3SO_3]_2$. Yet, it is to be appreciated that the claimed subject matter is not limited to the foregoing examples.

Ionic liquids, including those that comprise transition metal elements (metal ionic liquids), are a class of highly modifiable molten salts; for instance, ionic liquids can be salts with melting points below 100° C. Ionic liquids can have features such as high thermal stability, negligible vapor pressure, wide electrochemical window, and the ability to dissolve a range of organic and inorganic compounds; such features make ionic liquids attractive for a wide range of applications (e.g., solvents, electrically conducting fluids, etc.). Many of the properties of ionic liquids can be systematically varied by subtle compositional and structural changes. Further, it may be desirable to develop ionic liquids that simultaneously exhibit low viscosity and high conductivity for flow batteries.

Large, structurally asymmetric organic cations are often found in conventional ionic liquids, including those utilized as electrochemical solvents, because they lower the melting point by reducing the lattice energy of the crystalline salt. Recently, some conventional ionic liquids include transition metal-based anions. Examples include compounds including imidazolium cations with tetrahedral halogenoferrates and phosphonium cations with various cobaltates as well as ionic liquids including alkyl ammonium, phosphonium, or imidazolium salts of polyoxotungstate clusters. According to other examples, some conventional ionic liquids include transition metal-based cations. By way of illustration, some ionic liquids have $Ag(H_2N—R)_2^+$ or $Zn(H_2N—R)_4^{2+}$ (R=alkyl group) cations, and there are also a number of compounds that include ferrocenyl-functionalized cations.

In contrast to conventional ionic liquids which oftentimes include cations with low structural symmetry, the metal ionic liquids set forth herein include cations that have electronically asymmetric secondary coordination spheres that perturb pairing with anions. The nitrogen containing functional group and the oxygen containing functional group of a cation of the metal ionic liquid can have localized dipoles (e.g., the amine functional group and the hydroxyl function group are polarizable); thus, the localized dipoles can produce the electronically asymmetric secondary coordination sphere of the cation. Partial positive and negative charges can be sufficiently distributed in a secondary coordination sphere of the cation to limit interaction with an anion while simultaneously keeping electrons sufficiently mobile to either add charge to or remove charge from the transition metal ion at the center of the cation complex. Further, the electronically asymmetric cations can lower the melting point of the metal ionic liquids.

According to an example, FIG. 1 illustrates an exemplary structural formula of a cation in an exemplary metal ionic liquid, namely $Cu\{NH_2CH_2CH_2OH\}_6[CH_3(CH_2)_3CH(C_2H_5)CO_2]_2$. The cation has a pseudo-octahedral structural symmetry (with an almost insect-like motif). As depicted, $NH_2CH_2CH_2OH$ is coordinated to the transition metal (e.g., Cu) through an amine functional group.

Figure 2:
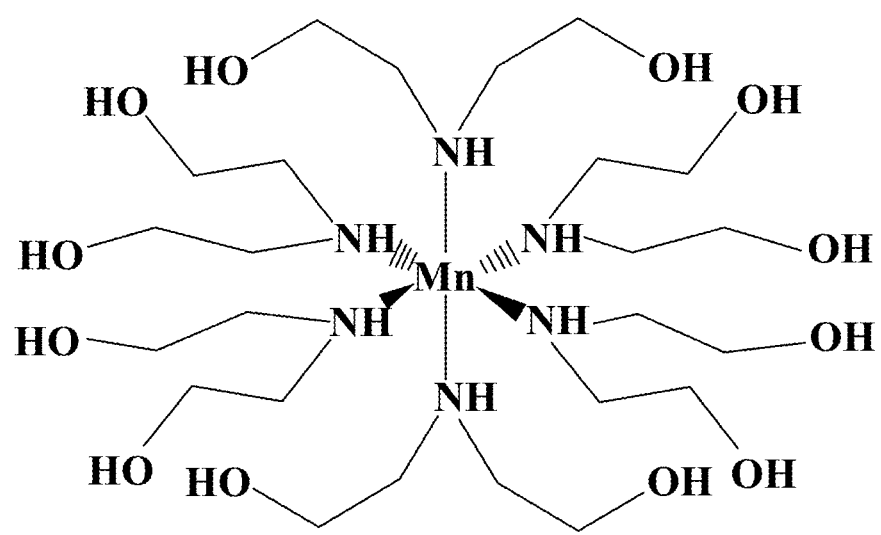

By way of another example, FIG. 2 illustrates an exemplary structural formula of a cation in $Mn\{NH(CH_2CH_2OH)_2\}_6[CF_3SO_3]_2$ (e.g., another exemplary metal ionic liquid). Again, the cation shown in FIG. 2 has a pseudo-octahedral structural symmetry. Further, $NH(CH_2CH_2OH)_2$ is coordinated to the transition metal (e.g., Mn) through an amine functional group.

Figure 3:
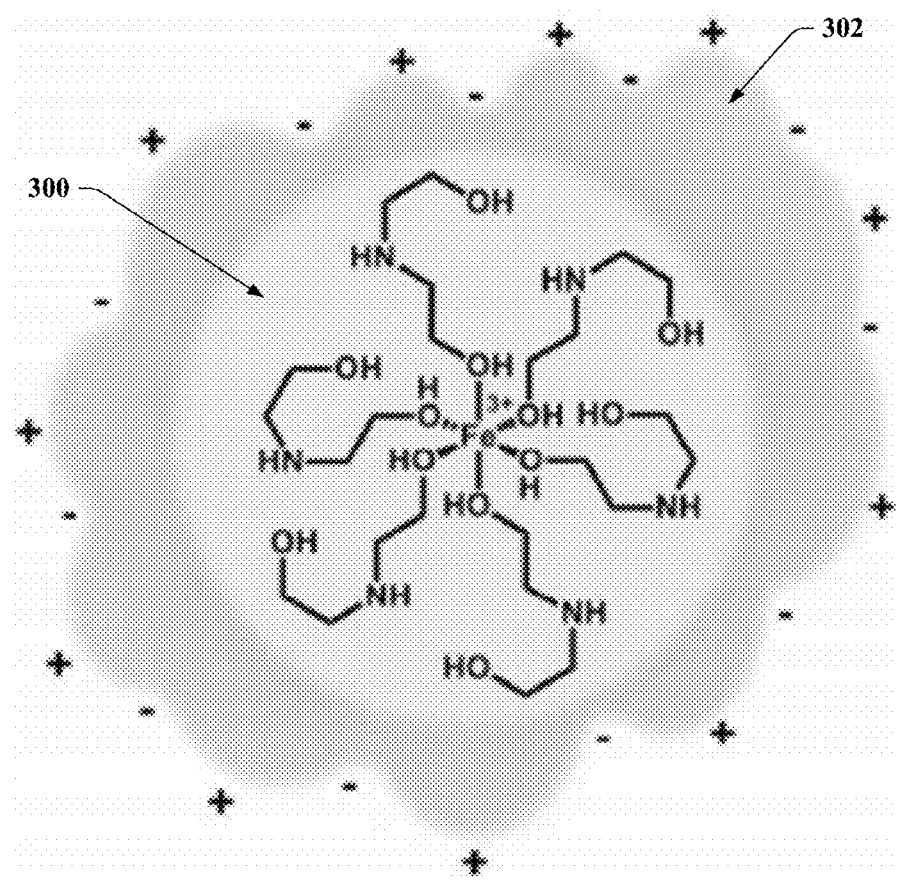

In accordance with yet a further example, FIG. 3 illustrates an exemplary structural formula of a cation in $Fe\{NH(CH_2CH_2OH)_2\}_6[CF_3SO_3]_3$ (e.g., another exemplary metal ionic liquid). Similar to the examples shown in FIGS. 1 and 2, the cation depicted in FIG. 3 has a pseudo-octahedral structural symmetry. In contrast to the examples of FIGS. 1 and 2, the ligand $(NH(CH_2CH_2OH)_2)$ of the cation in $Fe\{NH(CH_2CH_2OH)_2\}_6[CF_3SO_3]_3$ is coordinated to the transition metal (e.g., Fe) through a hydroxyl functional group rather than an amine functional group.

FIG. 3 further depicts a primary coordination sphere 300 and a secondary coordination sphere 302 of the cation in $Fe\{NH(CH_2CH_2OH)_2\}_6[CF_3SO_3]_3$. The amine and hydroxyl functional groups of the ligand are polarizable. Accordingly, the polarizable amine and hydroxyl functional groups distal to the iron cation can create an electronically asymmetric secondary coordination sphere 302 that can perturb ion pairing (e.g., pairing with $[CF_3SO_3]_3$). By perturbing ion pairing, the polarizable amine and hydroxyl groups can lower electronic symmetry of the secondary coordination sphere 302.

Figure 4:
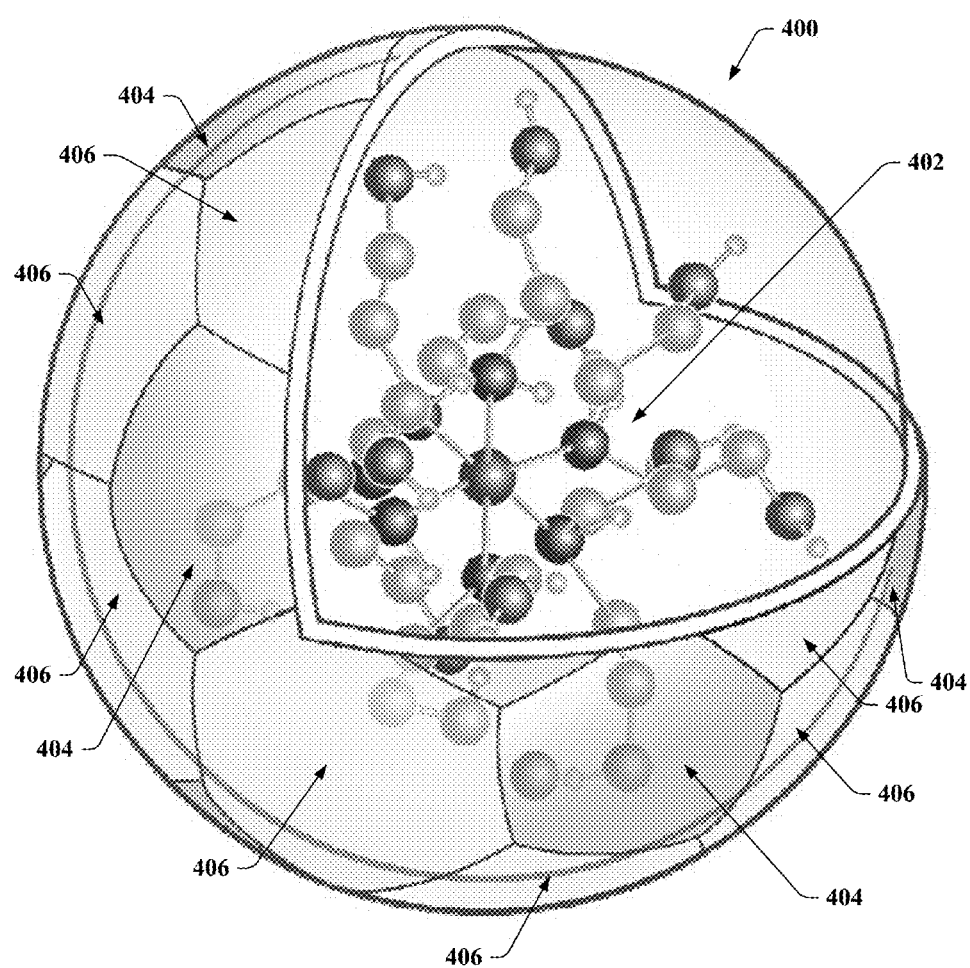
FIG. 4 illustrates an exemplary diagrammatic representation of an electronically asymmetric secondary coordination sphere of a cation of a metal ionic liquid.

Turning to FIG. 4, illustrated is an exemplary diagrammatic representation 400 of an electronically asymmetric secondary coordination sphere of a cation 402 of a metal ionic liquid. A portion of the diagrammatic representation 400 of the electronically asymmetric secondary coordination sphere is cut away to show the structure of the cation 402. The cation 402 can have a symmetric structure. Moreover, the amine and hydroxyl functional groups of the cation 402 are polarizable, and thus, localized dipoles can be created by such functional groups, resulting in the electronically asymmetric secondary coordination sphere. The dipoles can asymmetrically distribute charge in the secondary coordination sphere. While the cation 402 overall has a net positive charge, in the diagrammatic representation 400, pentagons 404 can each represent an arbitrary negative charge and hexagons 406 can each represent an opposite arbitrary positive charge, thereby illustrating the asymmetric charge distribution due to the polarizable amine and hydroxyl functional groups. Further, the localized negative charges distributed through the electronically asymmetric secondary coordination sphere can repulse the anion of the metal ionic liquid. Thus, the asymmetric charge distribution (as opposed to physical shape) of the cation 402 can mitigate pairing between the cation 402 and the anion.

Figure 5:
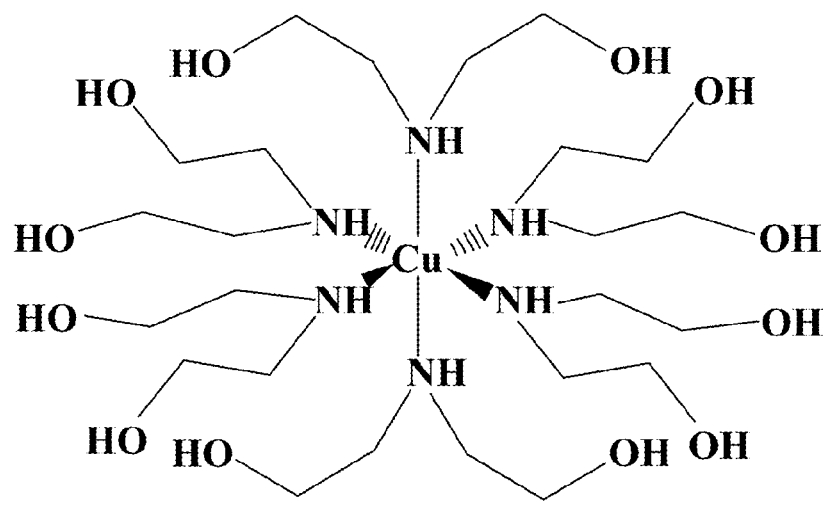
FIGS. 5-6 illustrate $Cu\{NH(CH_2CH_2OH)_2\}_6$ cations with differing ligand coordinations.
Figure 6:
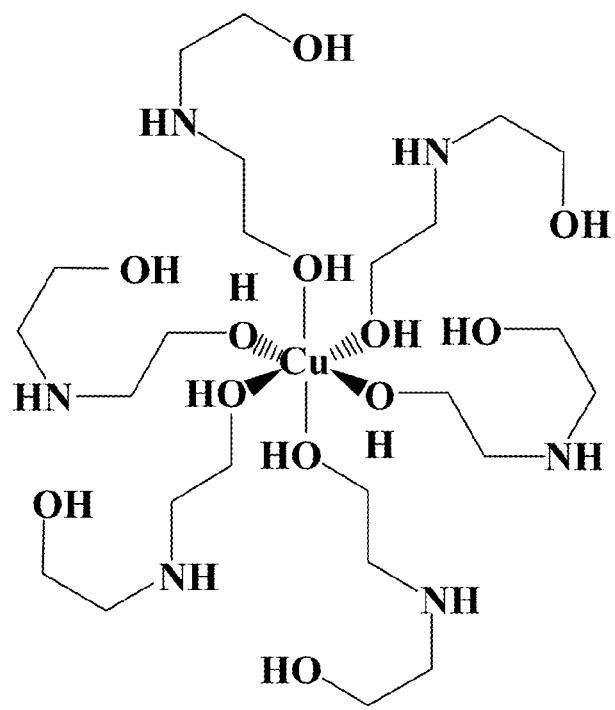

Moreover, a physiochemical property of the metal ionic liquid can be varied based at least in part on selection of the ligand and/or the anion. Such physiochemical property that can be varied can be viscosity, conductivity, or a combination thereof, for example. For instance, whether the ligand coordinates to the transition metal through the nitrogen containing functional group or the oxygen containing function group can be based on selection of the anion. FIGS. 5-6 depict $Cu\{NH(CH_2CH_2OH)_2\}_6$ cations with differing ligand coordinations.

In FIG. 5, the ligands coordinate to the transition metal (e.g., Cu) through amine functional groups. In contrast, in FIG. 6, the ligands coordinate to the transition metal (e.g., Cu) through the hydroxyl functional group. According to an example pertaining to the $Cu\{NH(CH_2CH_2OH)_2\}_6$ cation, when the anion is 2-ethylhexanoate or triflimide, the ligands coordinate through the amine functional group as shown in FIG. 5. Following this example, when the anion is triflate, the ligands coordinate through the hydroxyl functional group as shown in FIG. 6. Further following this example, viscosity of the metal ionic liquid can correspond to the ligand coordination. For instance, the cation of FIG. 6 has both amine and hydroxyl functional groups in the secondary coordination sphere, and thus, the cation of FIG. 6 has lower symmetry as compared to the cation of FIG. 5. The lower symmetry leads to a decrease in ion pairing, which leads to lower viscosity. Thus, by way of illustration, the ligand and anion (and transition metal) can be selected to provide a metal ionic liquid with low viscosity, high conductivity, and the ability to reversibly store charge (e.g., through changes in oxidation state of one or more metals incorporated into the molecular formula of the metal ionic liquid) for use in a flow battery; yet, the claimed subject matter is not so limited.

The metal ionic liquids can be used for flow battery energy storage. The metal ionic liquid is a non-aqueous liquid. Moreover, use of the metal ionic liquid in a flow battery can potentially provide wider voltage windows, higher charge cycle efficiency, decreased temperature sensitivity, and increased cycle life as compared to conventional flow batteries. Thus, the metal ionic liquids with reducing-oxidizing (redox) transition metal species can be incorporated into a flow battery cell configuration. A difference in potentials of two different metal ionic liquids can be relied upon to establish a cell voltage. The ionically conductive metal ionic liquids can act as both an electroactive material and a solvent of an electrolyte (e.g., catholyte and/or anolyte) in the flow battery. Moreover, since the metal ionic liquids can have negligible vapor pressure, safety issues related to cell pressurization can be mitigated.

Figure 7:
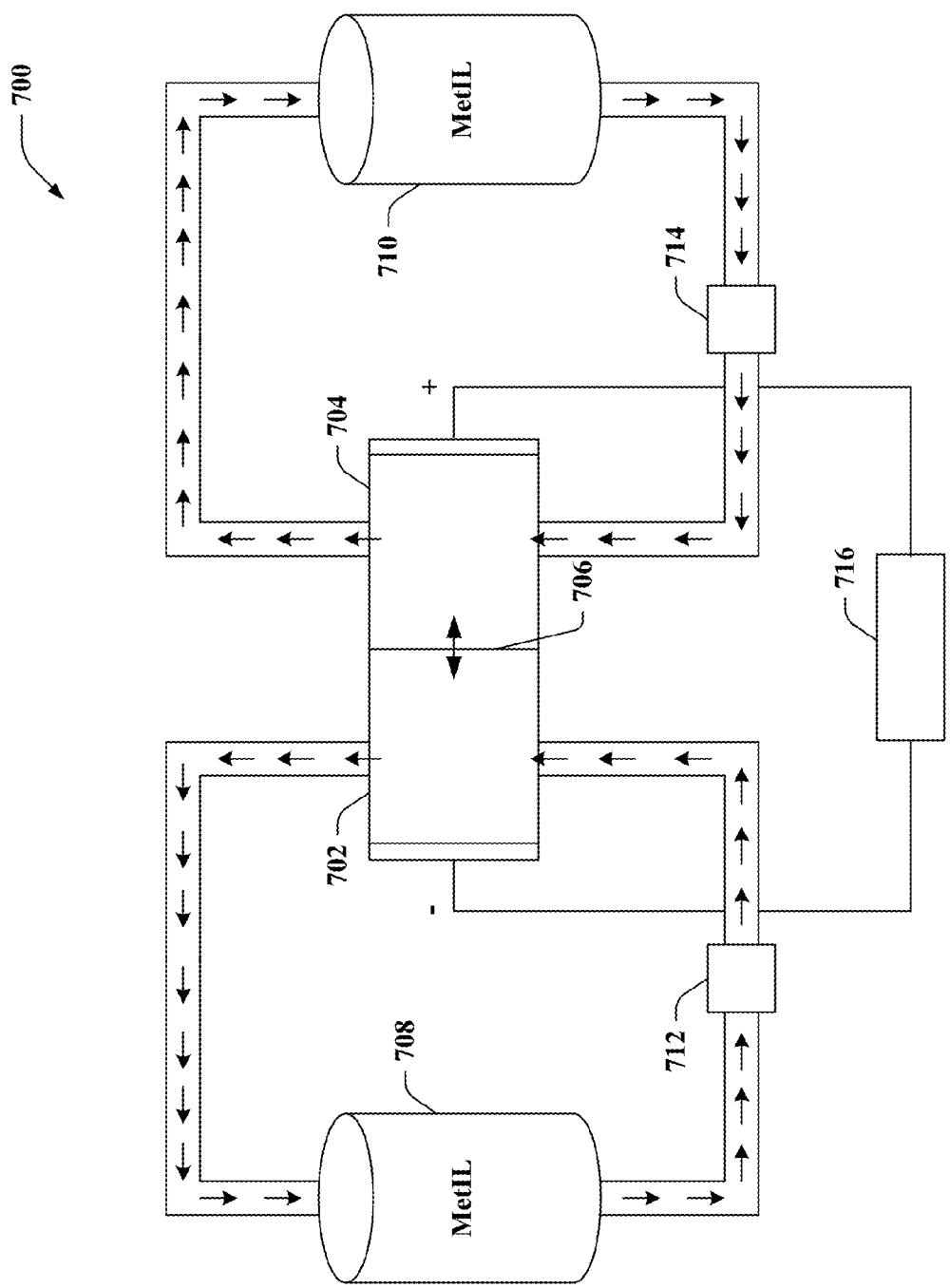
FIG. 7 illustrates an exemplary redox flow battery that includes metal ionic liquids.

With reference to FIG. 7, illustrated is an exemplary redox flow battery 700 that includes metal ionic liquids. The redox flow battery includes two electrodes (e.g., a cathode and an anode), namely, electrode 702 and electrode 704 (collectively referred to as electrodes 702-704). The two electrodes 702-704 are separated by an anion exchange membrane 706. Two electrolytes flow through the electrodes 702-704 (e.g., catholyte flows through the cathode and anolyte flows through the anode).

More particularly, the electrolytes included in the redox flow battery 700 are metal ionic liquids. Thus, a first metal ionic liquid flows through the electrode 702 and a second metal ionic liquid flows through the electrode 704. The first metal ionic liquid can include an anion and a first cation (e.g., a first ligand coordinated with a first transition metal), and the second metal ionic liquid can include the anion and a second cation (e.g., a second ligand coordinated with a second transition metal, where the first and second transition metals can be the same or different, and the first and second ligands can be the same or different). Reduction and oxidation reactions can occur in the first and second metal ionic liquids.

The flow battery 700 further includes a tank 708 and a tank 710 in which the metal ionic liquids are stored. Moreover, the flow battery 700 can include a pump 712 and a pump 714. The pump 712 can cause the first metal ionic liquid to flow from the tank 708 into the electrode 702, where the first metal ionic liquid can flow through the electrode 702 and return to the tank 708. Similarly, the pump 714 can cause the second metal ionic liquid to flow from the tank 710 into the electrode 704, where the second metal ionic liquid can flow through the electrode 704 and return to the tank 710.

Further, a circuit can be completed between the electrode 702 and the electrode 704 through a component 716. If the component 716 is an electrical power source, then the redox flow battery 700 can be charged. If the component 716 is an electrical power load, then the redox flow battery 700 can be discharged.

Conventional redox flow batteries commonly include electrolytes with electroactive materials (e.g., metal salts) dissolved in aqueous solvents. However, water in aqueous solvents can hydrolyze above 1.5 Volts; thus, these conventional flow batteries typically do not support potentials above 1.5 Volts. Moreover, aqueous solvents can be corrosive. Moreover, when a non-aqueous solvent is used instead for conventional electrolytes, lower amounts of electroactive materials oftentimes are able to be dissolved, thus resulting in lower energy densities.

In contrast, in the redox flow battery 700, the metal ionic liquids act as the electroactive materials and the solvents of the electrolytes (e.g., catholyte and anolyte). Thus, the metal ionic liquids can support higher energy densities compared to electrolytes of conventional redox flow batteries. Further, the metal ionic liquids have negligible vapor pressure and are non-corrosive. Moreover, the metal ionic liquids can allow for potentials above 1.5 Volts.

EXAMPLES

Set forth below are seven exemplary metal ionic liquids (referred to as Examples 1, 2, 3A, 3B, 3C, 4, and 5) that include an anion and a cation that comprises a transition metal and a ligand coordinated to the transition metal, where the ligand includes a nitrogen containing functional group and an oxygen containing functional group. The seven exemplary metal ionic liquids are $Fe\{NH(CH_2CH_2OH)_2\}_6[CF_3SO_3]_3$ (Example 1), $Cu\{NH_2CH_2CH_2OH\}_6[CH_3(CH_2)_3CH(C_2H_5)CO_2]_2$ (Example 2), $Cu\{NH(CH_2CH_2OH)_2\}_6[CH_3(CH_2)_3CH(C_2H_5)CO_2]_2$ (Example 3A), $Cu\{NH(CH_2CH_2OH)_2\}_6[CF_3SO_3]_2$ (Example 3B), $Cu\{NH(CH_2CH_2OH)_2\}_6[(CF_3SO_2)_2N]_2$ (Example 3C), $Mn\{NH(CH_2CH_2OH)_2\}_6[CF_3SO_3]_2$ (Example 4), and $Zn\{NH_2CH_2CH_2OH\}_6[CF_3SO_3]_2$ (Example 5). It is to be appreciated, however, that other metal ionic liquids that similarly include an anion and a cation having a transition metal and a ligand coordinated to the transition metal, where the ligand includes the nitrogen and oxygen containing functional groups, are intended to fall within the scope of the hereto appended claims.

According to an example, the metal ionic liquids can be synthesized by mixing a metal salt with six equivalents of either EA or DEA. Additional heating drives the reactions to completion. A color change is observed upon coordination of the ligand for Examples 1, 2, 3A, 3B, 3C, and 4. The reactions are readily scalable and an analytically pure product is obtained in quantitative yield with a single step. Further, the metal to ligand ratio can be altered to four in the case of divalent copper and zinc, since these metals can have six- or four-coordinate geometries. While copper 2-ethylhexanoate and zinc triflate will react with four equivalents of EA, the resulting compounds are extremely viscous and decompose quickly (e.g., less than one day) in air.

Example syntheses of the seven exemplary compounds are described below. In these exemplary syntheses, all starting materials were from Aldrich or Alfa Aesar. $Fe(CF_3SO_3)_3$ was recrystallized from hot $CH_3CN$.

Synthesis of Example 1

A 2.00 g (3.98 mmol) sample of recrystallized $Fe(CF_3SO_3)_3$ was added to 2.51 g (23.9 mmol) of $NH(CH_2CH_2OH)_2$ in a 20 mL glass vial, thoroughly mixed for several minutes, and then heated to 115° C. in an oven for 15-20 minutes. Additional mixing was then performed by ultrasound for 5 minutes and the solution was again heated to 115° C. for 15-20 minutes (yield>99.9%). IR (ATR, 4000-500 cm$^{-1}$): 3440 (m), 3309 (sh), 3094 (w), 2938 (w), 2862 (m), 1608 (m), 1453 (m), 1273 (sh), 1240 (s), 1224 (s), 1161 (s), 1061 (s), 1024 (s), 811 (m), 760 (m), 635 (s), 574 (m), and 515 (m). Raman (1800-200 cm$^{-1}$): 1464 (m), 1227 (w), 1033 (s), 878 (w), 817 (w), 761 (s), 577 (m), 517 (w), 351 (m), and 317 (m). Electronic spectral data (400-700 nm, in BMI-PF$_6$) [$\lambda$, nm ($\epsilon$, M$^{-1}$ cm$^{-1}$)]: 477 (63). Density: 1.44±0.06 g mL$^{-1}$. Magnetic susceptibility: $\chi_{meas}$=5.78 BM at 295 K. Anal. Calcd. (%) for $Fe(NH(CH_2CH_2OH)_2)_6(CF_3SO_3)_3$: C, 28.6; H, 5.87; N, 7.41; F, 15.1; Fe, 4.9; S, 8.5. Found: C, 28.0; H, 5.76; N, 7.33; F, 14.7; Fe, 5.0; S, 8.8. [MW=1134 g mol$^{-1}$].

Synthesis of Example 2

A 2.00 g (5.72 mmol) amount of $Cu[(2\text{-}Et)C_5COO]_2$ (where (2-Et)C$_5$COO is 2-ethylhexanoate) was added to ethanolamine (2.06 g, 34.3 mmol) in a 20 mL glass vial, quickly heated to ~200° C., and continuously stirred for approximately 10 minutes without additional heating. IR (ATR, 4000-500 cm$^{-1}$): 3234 (m), 3151 (m), 2955 (w), 2927 (m), 2871 (w), 2857 (w), 1738 (m), 1548 (s), 1456 (m), 1399 (s), 1312 (m), 1231 (m), 1161 (w), 1067 (s), 1032 (s), 869 (m), 802 (m), 761 (w), 729 (w), 673 (w), 521 (w), and 486 (w). Anal. Calcd. (%): C, 47.0; Cu, 8.87; H, 10.1; N, 11.7. Found: C, 47.3; Cu, 8.8; H, 9.9; N, 11.5. [MW=716.5 g mol$^{-1}$].

Synthesis of Example 3A

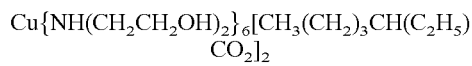

Copper(II) 2-ethylhexanoate (2.00 g, 5.72 mmol) was added to diethanolamine (3.62 g, 34.3 mmol) in a 20 mL glass vial, quickly heated to ~200° C., and continuously stirred for approximately 10 minutes without additional heating. IR (ATR, 4000-500 cm$^{-1}$): 3219 (s), 2926 (w), 2826 (w), 1739 (m), 1560 (s), 1455 (m), 1402 (m), 1377 (w), 1309 (w), 1230 (w), 1217 (w), 1204 (w), 1052 (s), 919 (w), 864 (w), 800 (m), 731 (w), 640 (w), and 547 (w). Anal. Calcd. (%): C, 49.0; Cu, 6.48; H, 9.87; N, 8.57. Found: C, 48.7; Cu, 6.8; H, 9.9; N, 8.5. [MW=980.8 g mol$^{-1}$].

Synthesis of Example 3B

A 2.00 g (5.53 mmol) amount of $Cu(OTf)_2$ (where OTf is $CF_3SO_3$) was added to diethanolamine (3.49 g, 33.2 mmol) in a 20 mL glass vial, quickly heated to ~200° C., and continuously stirred for approximately 10 minutes without additional heating. IR (ATR, 4000-500 cm$^{-1}$): 3406 (sh), 3285 (w), 2930

(w), 2875 (w), 1738 (m), 1612 (w), 1454 (m), 1365 (w), 1274 (sh), 1224 (w), 1161 (m), 1058 (m), 1025 (s), 943 (w), 880 (w), 814 (w), 758 (w), 636 (w), 573 (m), and 515 (m). Anal. Calcd. (%): C, 31.5; Cu, 6.40; F, 11.5; H, 6.70; N, 8.47; S, 6.46. Found: C, 32.1; Cu, 6.5; F, 11.7; H, 6.8; N, 8.3; S, 6.8. [MW=992.5 g mol$^{-1}$].

Synthesis of Example 3C

$Cu\{NH(CH_2CH_2OH)_2\}_6[(CF_3SO_2)_2N]_2$

A 2.00 g (3.21 mmol) amount of $Cu((CF_3SO_2)_2N)_2$ was added to 2.02 g (19.3 mmol) of diethanolamine in a 20 mL glass vial, quickly heated to ~200° C., and continuously stirred for approximately 10 minutes without additional heating. IR (ATR, 4000-500 cm$^{-1}$): 3522 (m), 3292 (m), 2940 (m), 2890 (m), 1456 (m), 1343 (s), 1325 (sh), 1228 (sh), 1191 (s), 1133 (m), 1050 (s), 983 (m), 913 (w), 873 (w), 813 (s), 791 (m), 740 (m), 653 (w), 610 (m), 569 (m), and 509 (m). Anal. Calcd. (%): C, 26.8; Cu, 5.06; F, 18.2; H, 5.30; N, 8.93; S, 10.2. Found: C, 26.1; Cu, 5.1; F, 17.7; H, 5.6; N, 8.9; S, 9.9. [MW=1254.7 g mol$^{-1}$].

Synthesis of Example 4

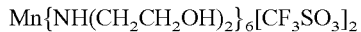

$Mn\{NH(CH_2CH_2OH)_2\}_6[CF_3SO_3]_2$

Manganese(II) triflate (2.00 g, 5.66 mmol) was added to diethanolamine (3.57 g, 40.0 mmol) in a 20 mL glass vial, quickly heated to ~200° C., and continuously stirred for approximately 10 minutes without additional heating. IR (ATR, 4000-500 cm$^{-1}$): 3299 (m), 2940 (w), 2849 (w), 1738 (m), 1455 (m), 1365 (m), 1247 (m), 1225 (w), 1164 (s), 1121 (m), 1027 (s), 937 (m), 802 (w), 760 (w), 637 (s), 574 (w), 515 (m), and 440 (w). Anal. Calcd. (%): C, 31.7; F, 11.6; H, 6.76; Mn, 5.58; N, 8.54; S, 6.52. Found: C, 30.6; F, 11.2; H, 6.8; Mn, 5.6; N, 8.8; S, 6.7. [MW=983.9 g mol$^{-1}$].

Synthesis of Example 5

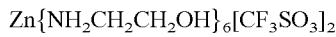

$Zn\{NH_2CH_2CH_2OH\}_6[CF_3SO_3]_2$

Zinc(II) triflate (2.00 g, 5.50 mmol) was added to ethanolamine (1.32 g, 22.0 mmol) in a 20 mL glass vial, quickly heated to ~175° C., and continuously stirred for approximately 10 minutes without additional heating. IR (ATR, 4000-500 cm$^{-1}$): 3440 (sh), 3269 (m), 3172 (w), 2953 (m), 2892 (w), 1738 (m), 1545 (m), 1463 (w), 1366 (w), 1241 (w), 1224 (w), 1160 (s), 1066 (m), 1023 (s), 873 (s), 760 (m), 633 (s), 574 (m), 515 (s), and 443 (w). $^{13}$C (100 MHz, CD$_3$CN) δ 121.0 (q, J=317 Hz), 61.5, 43.8. Anal. Calcd. (%): C, 19.8; F, 18.8; H, 4.64; N, 9.22; S, 10.6; Zn, 10.8. Found: C, 20.3; F, 18.1; H, 4.5; N, 8.9; S, 10.5; Zn, 11.0. [MW=607.9 g mol$^{-1}$].

The seven exemplary compounds were analyzed as set forth below. Magnetic susceptibility measurements were made on a Johnson and Matthey MK-1 balance and Pascal's constants were used to obtain a diamagnetic correction. The visible absorption spectra (300-700 nm) were collected on a Shimadzu UV-3600. Elemental analyses (C, H, N, Cu, F, Fe, Mn, S, and Zn) were performed by Galbraith Laboratories, Inc. Water content was measured using a Mettler Toledo DL32 Karl Fischer coulometer. Viscosity measurements were performed on a Brookfield DV-E viscometer.

For Example 1, thermal analysis was measured with a Mettler Toledo TGA/DSC 1 (Ar flow) and a TA Instruments DSC 2010 (with a quench cooling accessory, N$_2$ flow) with 10° C. min' heating. Infrared spectra were recorded for Example 1 on a Thermo Nicolet 380 FT-IR equipped with a Smart Orbit (Diamond) ATR (attenuated total reflectance) accessory. Raman data were acquired for Example 1 on a Thermo DXR with a 633 nm laser. X-ray fluorescence was performed for Example 1 with a Thermo ARL QUANT'X analyzer.

For Examples 2, 3A, 3B, 3C, 4, and 5, thermal analyses were measured with a TA Instruments Q600 and Q2000 (with an RCS 90 refrigerated cooling system). Infrared spectra were recorded for Examples 2, 3A, 3B, 3C, 4, and 5 on a Thermo Nicolet iS10 FT-IR equipped with a Smart Orbit (Diamond) ATR accessory. Solution $^{13}$C NMR spectra were recorded for Examples 2, 3A, 3B, 3C, 4, and 5 on a Bruker Avance DRX spectrometer operating at 100 MHz. The chemical shifts are reported in the δ scale in ppm with the solvent indicated as the internal reference. Coupling constants (J) are reported in Hz and the splitting abbreviation used is q, quartet.

For the seven exemplary compounds, conductivity measurements were made using a Solartron 1255B frequency analyzer with a SI 1287 electrochemical potentiostat using a custom cell with ~5 mm in diameter Platinum (Pt) working and Pt counter electrodes in a cofacial arrangement. This cell had a cell constant of ~10, as determined by measuring a solution of known specific conductance. The sample was thermally equilibrated prior to measurement by placing the cell in an instrumented Tenney environmental chamber to control temperature. Cyclic voltammograms were collected using a BAS 100B potentiostat in a three-electrode cell. The working electrode was freshly polished 3 mm diameter glassy carbon, Pt wire was the counter electrode, and the reference electrode was silver/silver chloride (Ag/AgCl) in 1-ethyl-3-methyl-imidazolium chloride (EMIC) in 1,2-dimethyl-3-propyl-imidazolium bis(trifluoromethylsulfonyl)imide (DMPI-Im). Measurements were performed in a glove box under argon (Ar).

Evaluation of Example 1

Example 1, $Fe\{NH(CH_2CH_2OH)_2\}_6[CF_3SO_3]_3$, was synthesized in a single-step complexation reaction. Infrared and Raman data suggested $NH(CH_2CH_2OH)_2$ primarily coordinated to Fe(III) through alcohol groups. Example 1 had temperature for glass transition (T$_g$) and temperature for decomposition (T$_d$) values of −64° C. and 260° C., respectively. Cyclic voltammetry revealed quasi-reversible Fe(III)/Fe(II) reduction waves.

Example 1 was obtained by mixing the solid metal salt Fe(CF$_3$SO$_3$)$_3$ with liquid $NH(CH_2CH_2OH)_2$ in a 1:6 stoichiometry. The reaction was exothermic but additional heating drove the reaction to completion. A color change from almost white to red-orange was observed upon coordination of $NH(CH_2CH_2OH)_2$. The reaction was a direct combination reaction rather than a metathesis reaction. If the color is green the iron is in the +2 oxidation state instead of +3. Moreover, the presence of two simultaneously present functional groups (alcohol and amine of $NH(CH_2CH_2OH)_2$) was required to produce the metal ionic liquid (e.g., assuming no change in hydrocarbon chain length). Reaction of Fe(CF$_3$SO$_3$)$_3$ with either CH$_3$CH$_2$NH$_2$ or CH$_3$CH$_2$OH alone failed to produce an ionic liquid.

Example 1 was evaluated by elemental analysis, viscometry, thermogravimetric analysis-differential scanning calorimetry (TGA-DSC), infrared, Raman, and ultraviolet-visible (UV-Vis) spectroscopy. The electrochemical properties of Example 1 were evaluated using cyclic voltammetry and impedance spectroscopy.

Figure 8:
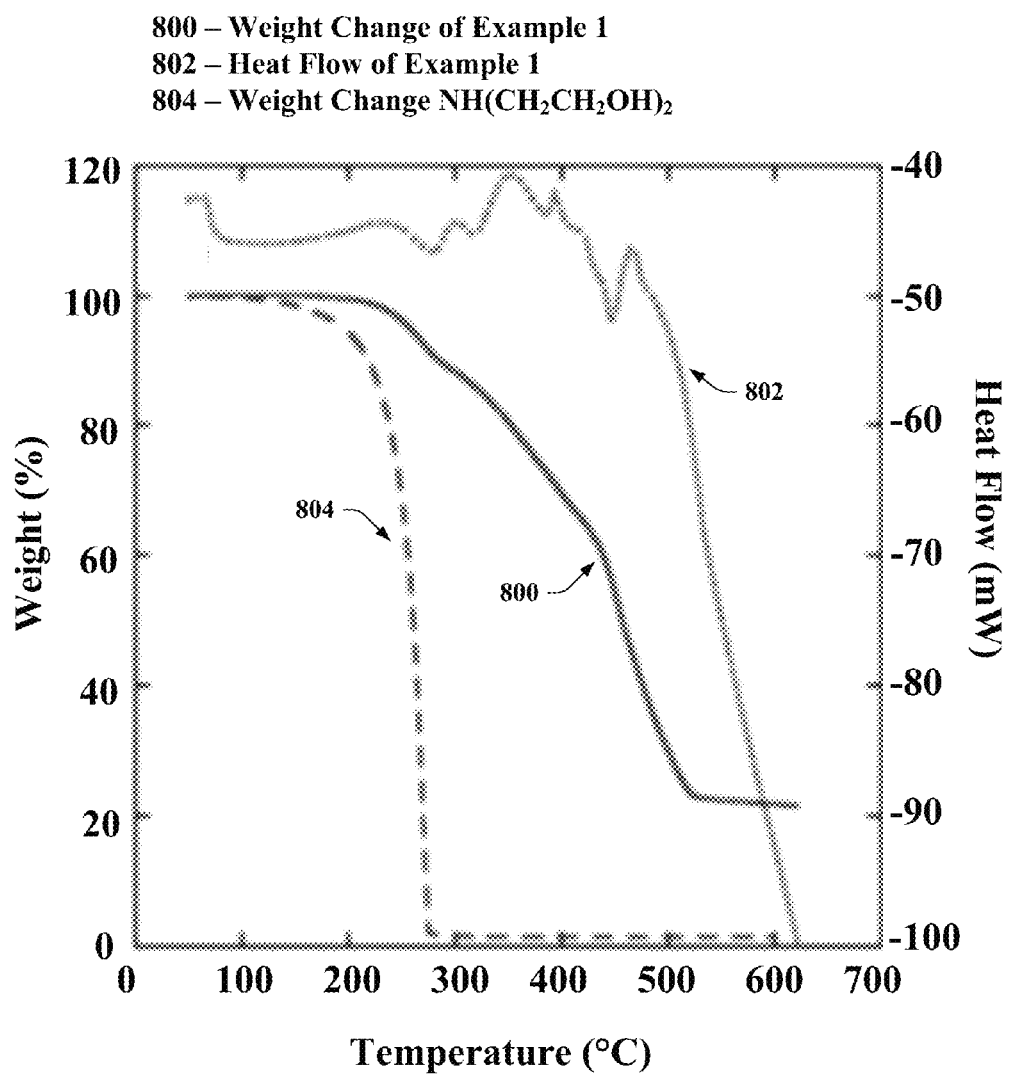
FIG. 8 illustrates a weight change of Example 1, a heat flow of Example 1, and a weight change of $NH(CH_2CH_2OH)_2$.
Figure 9:
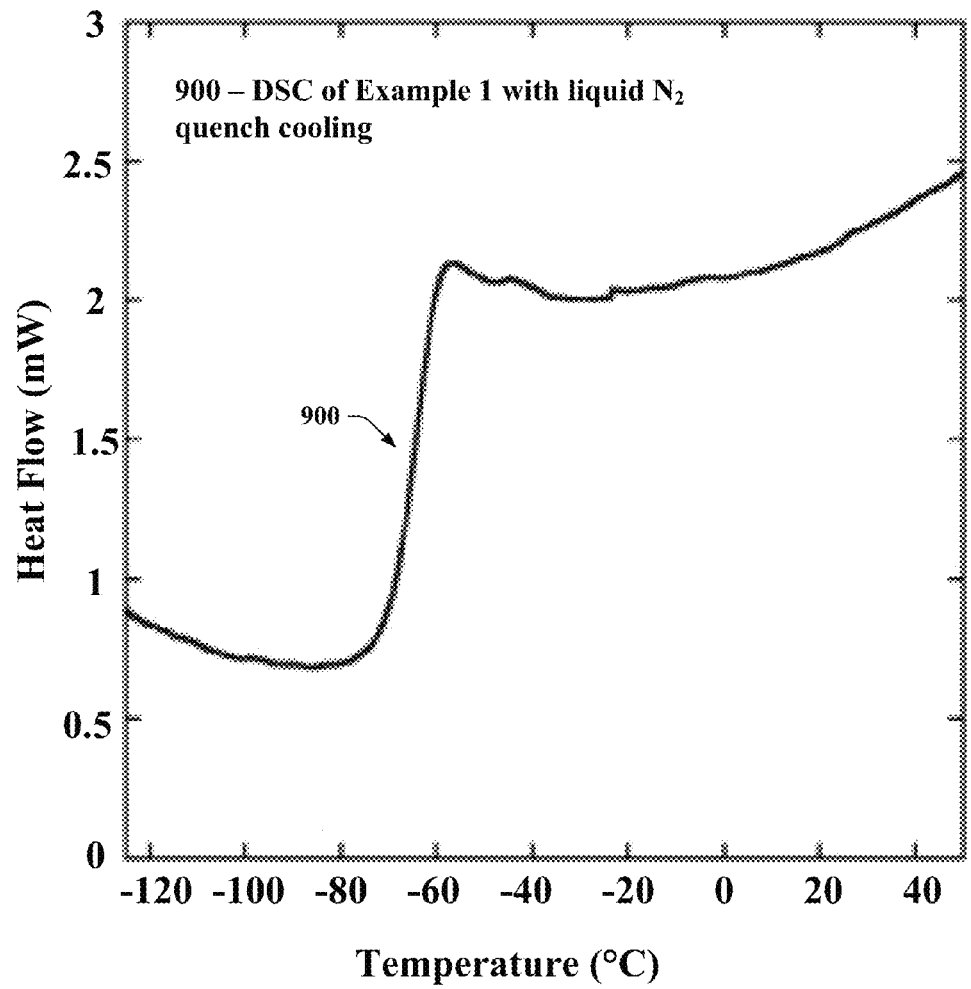
FIG. 9 illustrates results of a differential scanning calorimetry measurement of Example 1 performed using a liquid $N_2$ quench cooling accessory.

The stability of Example 1 was evaluated by thermogravimetric analysis (TGA) coupled with differential scanning calorimetry (DSC) and the results are shown in FIG. 8. In FIG. 8, a weight change of Example 1 is illustrated as line 800, a heat flow of Example 1 is illustrated as line 802, and a weight change of $NH(CH_2CH_2OH)_2$ is illustrated as line 804. No change in mass of Example 1 was observed up to 260° C. Under identical conditions, $NH(CH_2CH_2OH)_2$ alone started to evaporate around 200° C. This observation provided evidence that (1) $NH(CH_2CH_2OH)_2$ was coordinated to Fe(III) and that (2) $Fe(CF_3SO_3)_3$ was not simply dissolved in $NH(CH_2CH_2OH)_2$ solvent. A DSC measurement of Example 1 was also performed using a liquid $N_2$ quench cooling accessory and the results are shown in FIG. 9 (illustrated as line 900). As depicted in FIG. 9, there was a $T_g$ at −64° C., indicative of an amorphous glass reforming a liquid upon heating.

Figure 10:
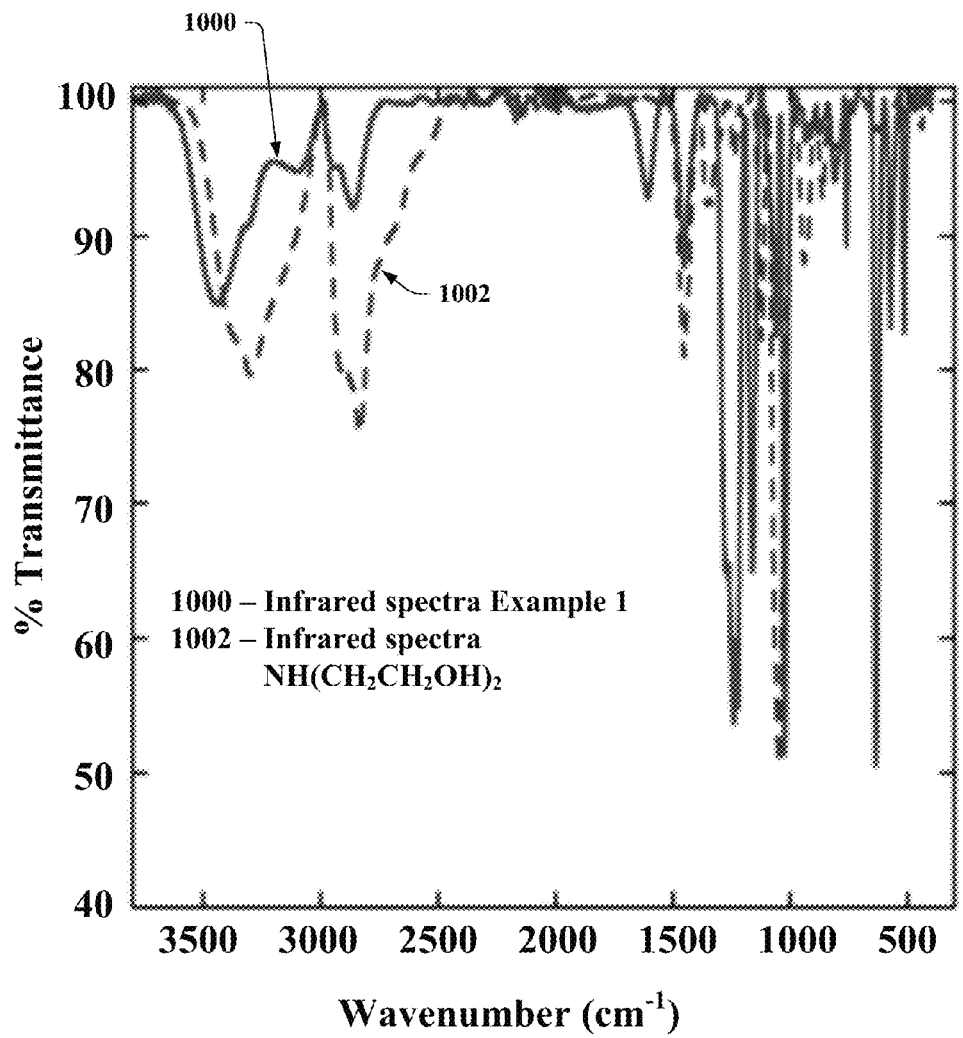
FIG. 10 illustrates infrared spectra of Example 1 and infrared spectra of $NH(CH_2CH_2OH)_2$.

FIG. 10 illustrates infrared spectra of Example 1 (line 1000) and infrared spectra of $NH(CH_2CH_2OH)_2$. The infrared bands from 3500-3200 $cm^{-1}$ and 3100-2700 $cm^{-1}$ were associated with the alcohol and amine functional groups of $NH(CH_2CH_2OH)_2$, respectively. The alcohol and amine bands of Example 1 were blue-shifted by approximately 200 $cm^{-1}$ and 30 $cm^{-1}$, respectively, relative to $NH(CH_2CH_2OH)_2$. The observed blue-shifts support the TGA data that indicate $NH(CH_2CH_2OH)_2$ was coordinated to Fe(III). In addition, the larger blue-shift of the alcohol group relative to the amine indicates that $NH(CH_2CH_2OH)_2$ was preferentially coordinated through the alcohol groups.

Figure 11:
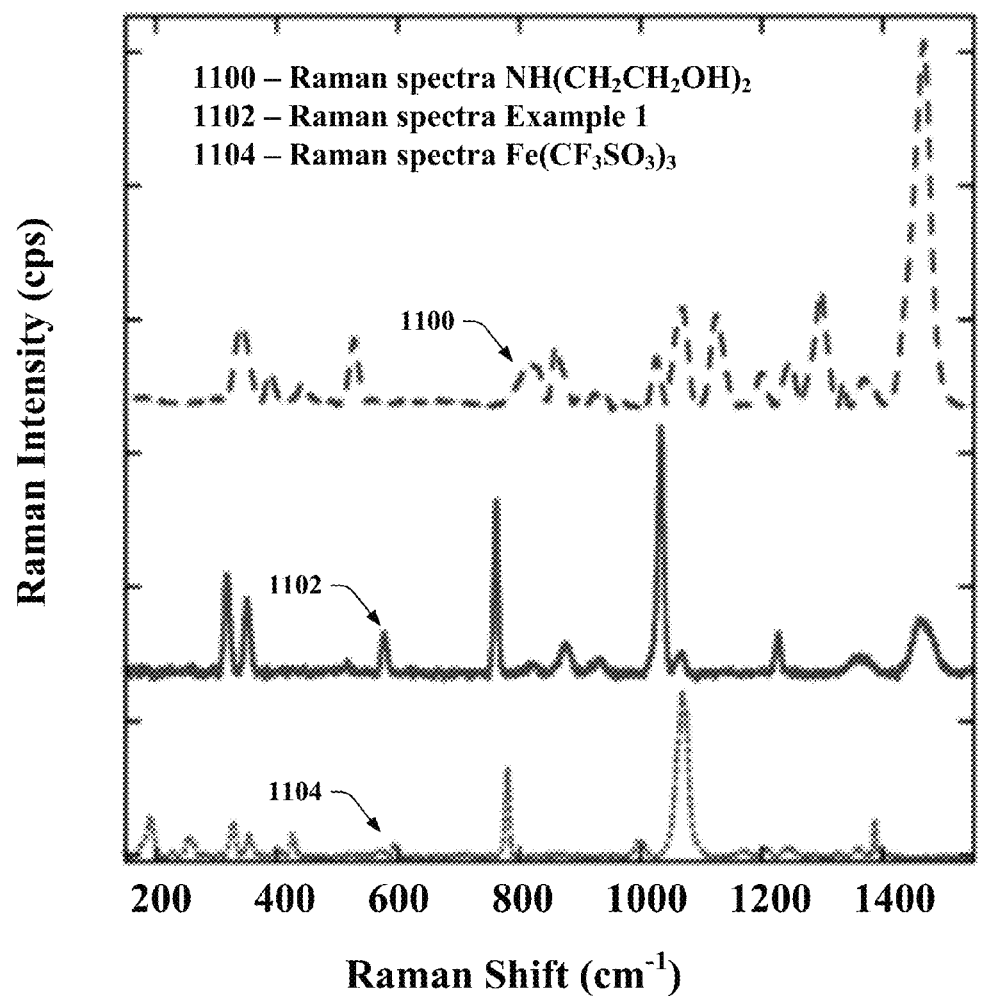
FIG. 11 illustrates Raman spectra (633 nm laser) of $NH(CH_2CH_2OH)_2$, Example 1, and $Fe(CF_3SO_3)_3$.

FIG. 11 illustrates Raman spectra (633 nm laser) of $NH(CH_2CH_2OH)_2$ (line 1100), Example 1 (line 1102), and $Fe(CF_3SO_3)_3$ (line 1104). The $Fe(CF_3SO_3)_3$ symmetrical deformation and stretching frequencies associated with $CF_3$ (780 $cm^{-1}$) and $SO_3$ (1075 $cm^{-1}$) respectively, were red-shifted in Example 1. The foregoing was consistent with displacement of $CF_3SO_3^{-1}$ by $NH(CH_2CH_2OH)_2$ around the Fe(III) centers. In addition, there was a peak in Example 1 (line 1100) around 300 $cm^{-1}$ not associated with either $CF_3SO_3^{-1}$ or $NH(CH_2CH_2OH)_2$. This peak around 300 $cm^{-1}$ was associated with a Fe—O bond due to preferential coordination through the alcohol group of $NH(CH_2CH_2OH)_2$.

Figure 12:
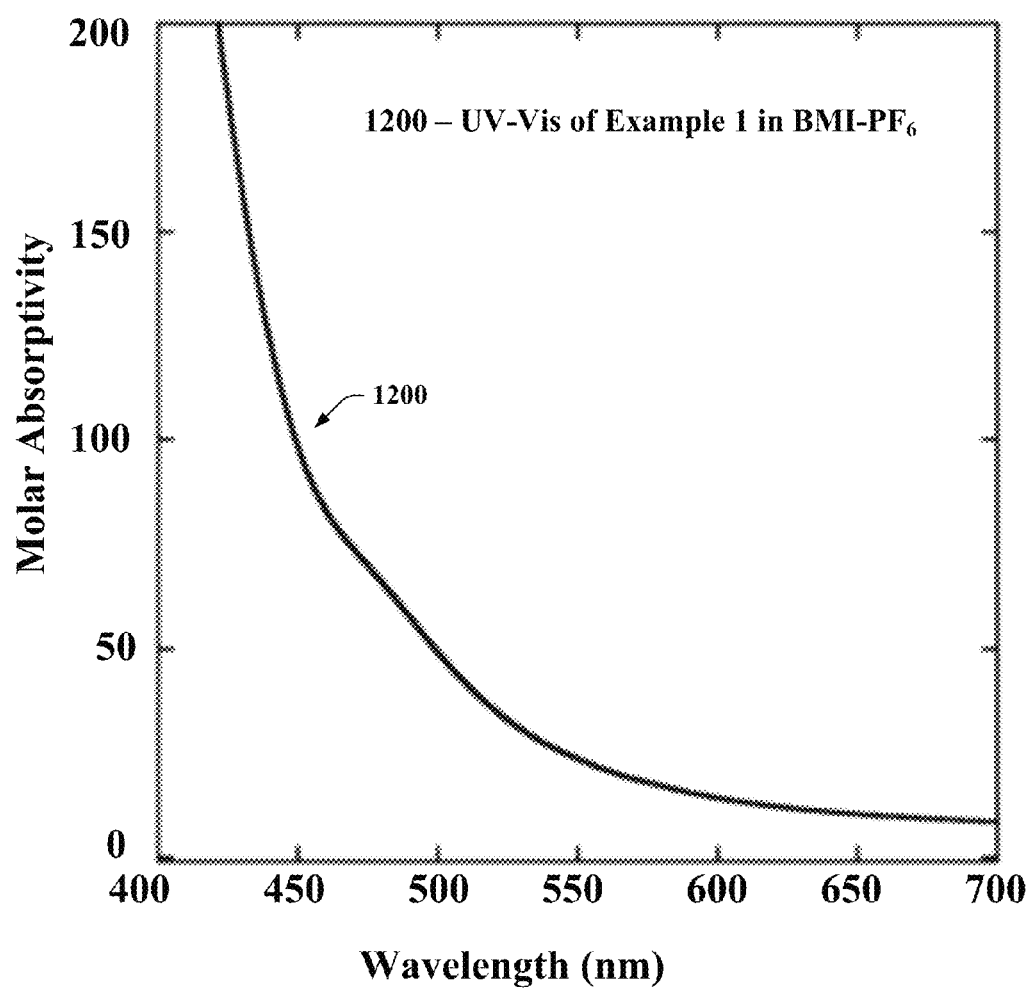
FIG. 12 illustrates ultraviolet-visible spectroscopic data of Example 1 in 1-butyl-3-methyl-imidazolium hexafluorophosphate ($BMI-PF_6$).

FIG. 12 depicts UV-Vis spectroscopic data of Example 1 in 1-butyl-3-methyl-imidazolium hexafluorophosphate (BMI-$PF_6$) as represented by line 1200. The high optical absorption of Example 1 prevented direct acquisition of UV-Vis spectroscopic data. As a result, Example 1 was dissolved in BMI-$PF_6$. A single $\lambda_{max}$ (wavelength of maximum absorption) was observed at 477 nm. The position of the $\lambda_{max}$ at 477 nm, along with value of an extinction coefficient ($\epsilon$=63), suggested this peak may be attributed to an iron d-d transition and was consistent with preferential coordination through the alcohol groups. There were no changes to the infrared and Raman difference spectra (subtraction of solvent peaks) of Example 1 in BMI-$PF_6$, and there was no shift in $\lambda_{max}$ as a function of the concentration of Example 1, suggesting that $PF_6^-$ was not coordinating to Fe(III).

The specific conductivity ($\sigma$) of Example 1 (with <2 ppm $H_2O$) at 25° C. was 207 $\mu S\ cm^{-1}$. The activation energy of conduction ($E_a$), measured from an Arrhenius plot, was 13.1 kcal $mol^{-1}$. In comparison, typical activation energy values for conduction in aqueous and molten metal salts are ~3-5 kcal $mol^{-1}$. The data suggests significant ion pairing was present in Example 1.

Figure 13:
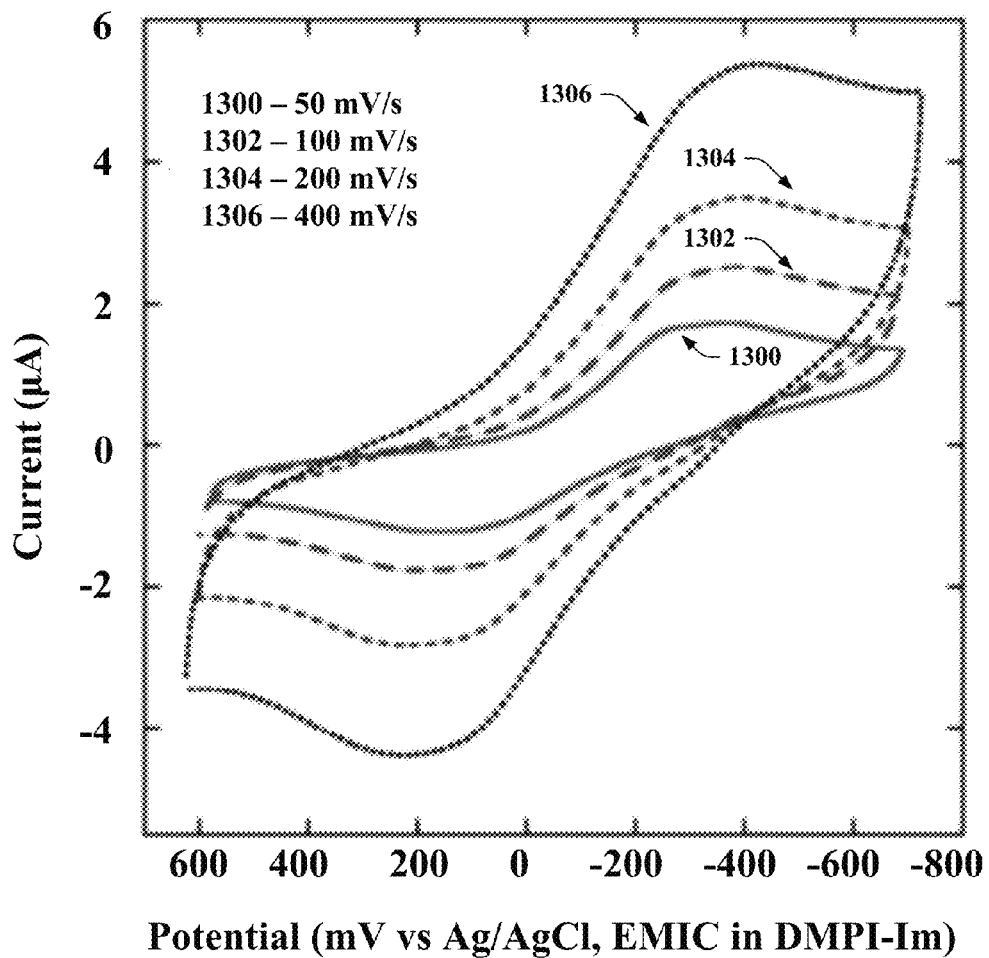
FIG. 13 illustrates cyclic voltammograms of Example 1, which were performed with a glassy carbon working electrode at four different scan rates.
Figure 14:
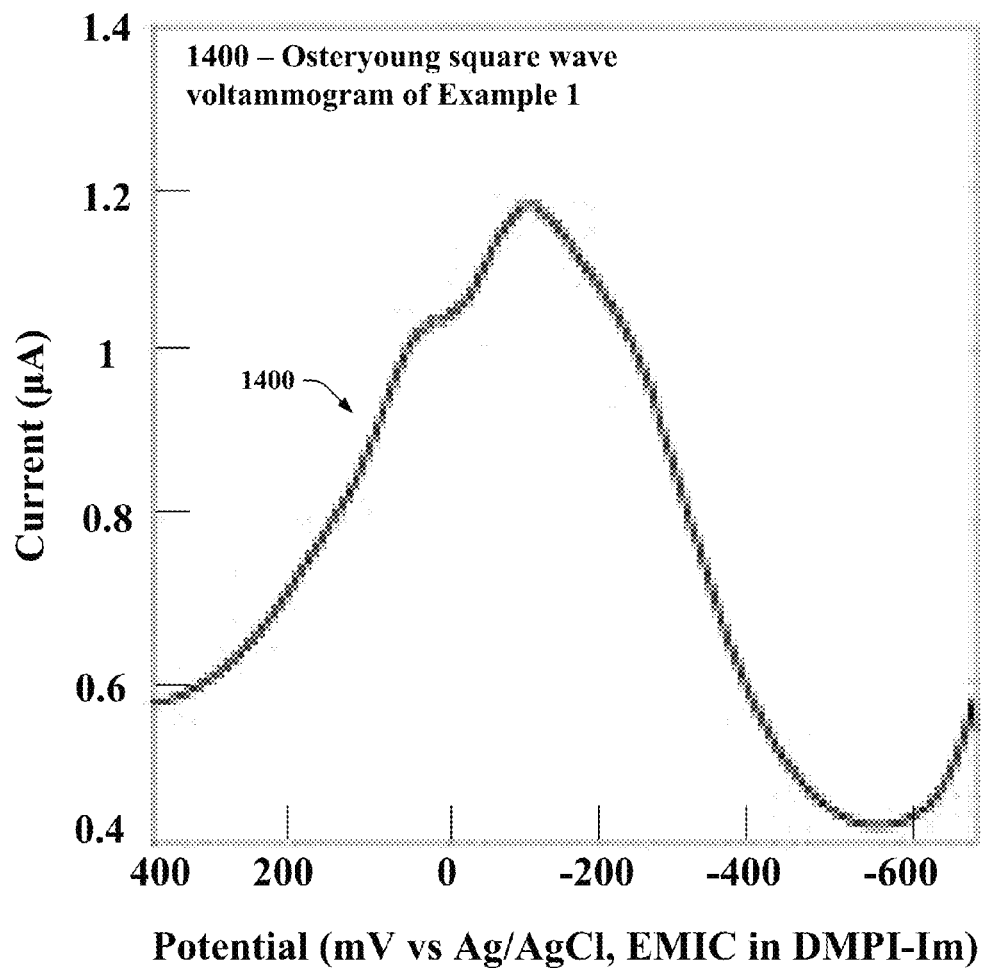
FIG. 14 illustrates a Osteryoung square wave voltammogram of Example 1 with 1 mV steps, sweep width amplitude of 25 mV, and sweep width frequency of 15 Hz.

Cyclic voltammograms (CVs) of Example 1, which were performed with a glassy carbon working electrode at four different scan rates, are illustrated in FIG. 13. A scan rate of 50 mV/s is represented by line 1300, a scan rate of 100 mV/s is represented by line 1302, a scan rate of 200 mV/s is represented by line 1304, and a scan rate of 400 mV/s is represented by line 1308. The high viscosity and low conductivity of Example 1 prevented the direct acquisition of electrochemical data. As a result, CV measurements were performed on a 0.011 M solution of Example 1 in BMI-$PF_6$, and stability was confirmed by UV-Vis measurements. Example 1 displayed several quasi-reversible waves associated with Fe(III)/Fe(II) reduction and oxidation, which were more resolved at slower scan rates. To further resolve these peaks, an Osteryoung square wave voltammogram was acquired on Example 1 as depicted by line 1400 in FIG. 14. FIG. 14 illustrates the Osteryoung square wave voltammogram of Example 1 with 1 mV steps, sweep width amplitude of 25 mV, and sweep width frequency of 15 Hz. The results show there were three waves. An explanation for this behavior is that the pendant —$CH_2CH_2OH$ groups of the $NH(CH_2CH_2OH)_2$ ligands were coordinating to adjacent Fe(III) centers. This is consistent with the magnetic susceptibility measurement of Example 1 at 25° C. showing there was a small amount of antiferromagnetic coupling, where the measured magnetic susceptibility ($\chi_{meas}$) was 5.78 BM at 295 K and the calculated magnetic susceptibility ($\chi_{calc}$) was 5.90 BM.

Evaluation of Examples 2, 3A, 3B, 3C, 4, and 5

In Examples 2, 3A, 3B, 3C, 4, and 5, copper-, manganese-, and zinc-based ionic liquids ($Cu\{NH_2CH_2CH_2OH\}_6[CH_3(CH_2)_3CH(C_2H_5)CO_2]_2$ (Example 2), $Cu\{NH(CH_2CH_2OH)_2\}_6[CH_3(CH_2)_3CH(C_2H_5)CO_2]_2$ (Example 3A), $Cu\{NH(CH_2CH_2OH)_2\}_6[CF_3SO_3]_2$ (Example 3B), $Cu\{NH(CH_2CH_2OH)_2\}_6[(CF_3SO_2)_2N]_2$ (Example 3C), $Mn\{NH(CH_2CH_2OH)_2\}_6[CF_3SO_3]_2$ (Example 4), and $Zn\{NH_2CH_2CH_2OH\}_6[CF_3SO_3]_2$ (Example 5)) were synthesized in single-step reactions Infrared data suggested that ethanolamine preferentially coordinated to the metal center through the amine group in Example 2 and the hydroxyl group in Example 5. In addition, infrared data suggested that diethanolamine coordinated through the amine group in Example 3A, Example 3C, and Example 4 and the hydroxyl group in Example 3B. Examples 2, 3A, 3B, 3C, 4, and 5 were viscous (>1000 cP) at room temperature, but two of the Examples, namely Example 3C and Example 4, displayed specific conductivities that are reasonably high for ionic liquids (>20 mS $cm^{-1}$). Examples 2, 3A, 3B, 3C, 4, and 5 each displayed a glass transition ($T_g$) below −50° C. The cyclic voltammograms (CVs) of Examples 2, 3A, 3B, and 3C displayed a single quasi-reversible wave associated with Cu(II)/Cu(I) reduction and re-oxidation, while the CV of Example 5 showed a wave attributed to Zn(II)/Zn(0) reduction and stripping. Example 4 displayed reversible Mn(II)/Mn(III) oxidation and re-reduction at 50 mV/s using a glassy carbon working electrode.

Examples 2, 3A, 3B, 3C, 4, and 5 were synthesized by mixing the metal salt ($Cu[2-Et]C_5COO]_2$, $Cu[OTf]_2$, $Mn[OTf]_2$, or $Zn[OTf]_2$) with six equivalents of either EA or DEA. Additional heating drove the reactions to completion. A color change was observed upon coordination of the ligand for Examples 2, 3A, 3B, 3C, and 4, while a color change was not observed for Example 5. The reactions were direct combination reactions; thus, an analytically pure product was obtained in quantitative yield with a single step. The metal to ligand ratio was altered to four in the case of divalent copper and zinc, since these metals can have six- or four-coordinate geometries. While copper 2-ethylhexanoate and zinc triflate reacts with four equivalents of EA, the resulting compounds were extremely viscous and decomposed quickly (e.g., less than one day) in air.

Examples 2, 3A, 3B, 3C, 4, and 5 were evaluated by elemental analysis, viscometry, TGA-DSC, infrared and UV-Visible spectroscopy, and their electrochemical properties were evaluated using impedance spectroscopy and cyclic voltammetry. In addition, $^{13}$C NMR was used to analyze Example 5.

Figure 15:
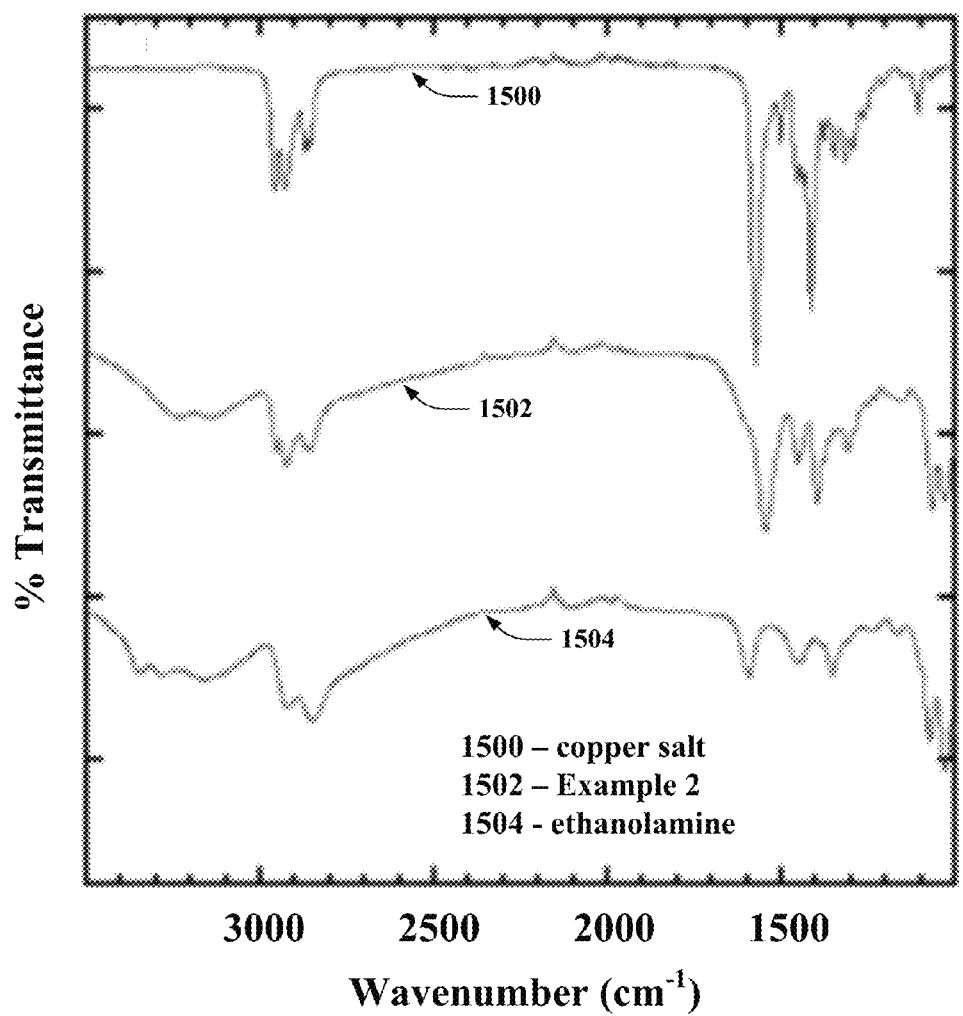
FIG. 15 illustrates infrared spectra of copper 2-ethylhexanoate, infrared spectra of Example 2, and infrared spectra of ethanolamine.

Infrared spectroscopy was used to identify the preferred mode of coordination (hydroxyl or amine) in each of the Examples. Specifically, shifts in the stretching frequencies of the infrared bands from 3500-3200 cm$^{-1}$ (O—H) and 3100-2700 cm$^{-1}$ (N—H) for the secondary amine, DEA, and from 3000-2800 cm$^{-1}$ (O—H) and 3400-3100 cm$^{-1}$ (N—H) for the primary amine, EA, were measured. FIG. 15 illustrates infrared spectra of Cu[(2-Et)C$_5$COO]$_2$ (represented by line 1500), infrared spectra of Example 2 (represented by line 1502), and infrared spectra of EA (represented by line 1504). The hydroxyl and amine bands of Example 2 were blue-shifted by 15 cm$^{-1}$ and 60 cm$^{-1}$, respectively, relative to EA. The larger shift of the amine group relative to the hydroxyl suggested EA preferentially coordinated through the amine. Similar observations were made for Examples 3A, 3B, 3C, 4, and 5, and the results are summarized in Table 1. Examples 1, 3B, and 5 preferentially coordinated through the hydroxyl group(s), while Examples 2, 3A, 3C, and 4 coordinated through the amine.

Figure 16:
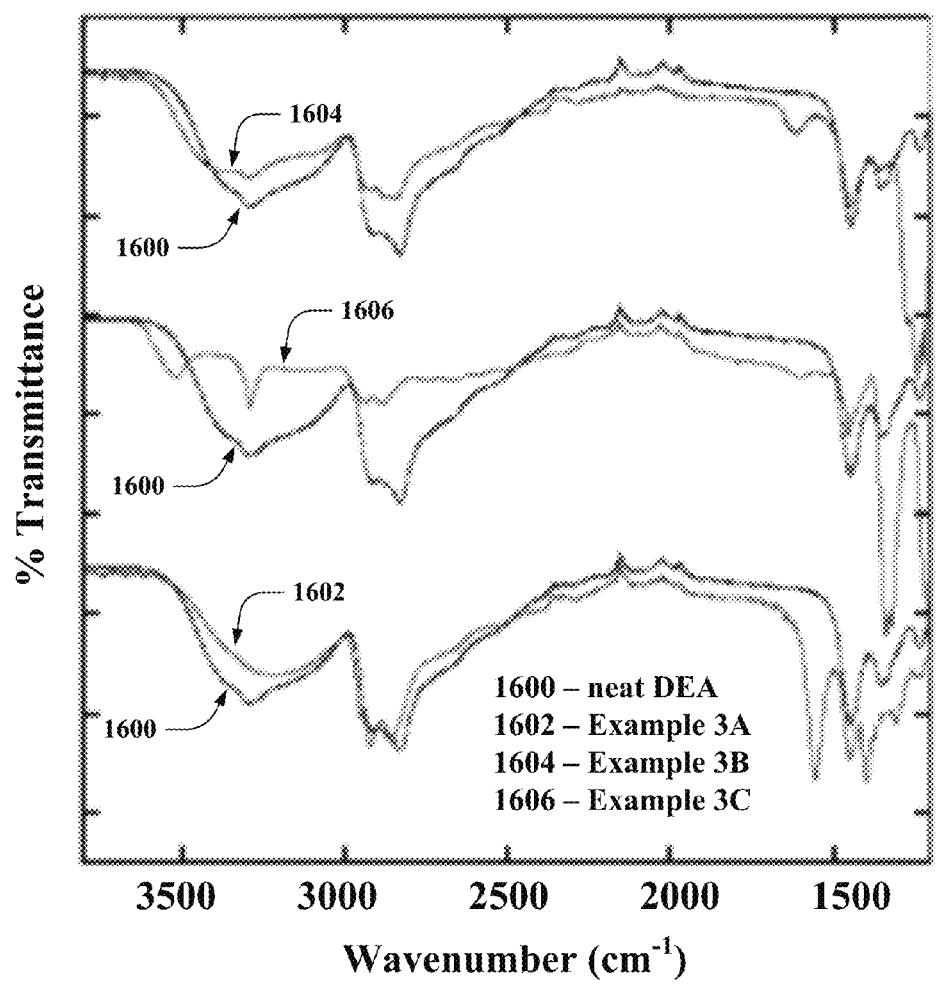
FIG. 16 illustrates infrared spectra of Example 3A, infrared spectra of Example 3B, and infrared spectra of Example 3C, each compared to infrared spectra of neat diethanolamine.

It is noted that although the cations of Examples 3A, 3B, and 3C all included one Cu(II) and six EA ligands, the preferred mode of coordination varied as a function of the anion (e.g., 2-ethylhexanoate, triflate, or triflimide). FIG. 16 depicts infrared spectra of Example 3A (illustrated by line 1602), infrared spectra of Example 3B (illustrated by line 1604), and infrared spectra of Example 3C (illustrated by line 1606) each compared to infrared spectra of neat DEA (illustrated by line 1600). Accordingly, FIG. 16 shows the variation in preferred mode of coordination as a function of the anion (e.g., larger shifts of the amine groups relative to the hydroxyl groups for Examples 3A and 3C and larger shift of the hydroxyl group relative to the amine group for Example 3B).

TABLE 1

| Example | Hydroxyl shift (cm$^{-1}$) | Amine shift (cm$^{-1}$) |
| --- | --- | --- |
| 1 | 200 | 30 |
| 2 | 15 | 60 |
| 3A | 10 | 80 |
| 3B | 50 | 10 |
| 3C | 5 | 20 |
| 4 | 5 | 30 |
| 5 | 30 | 5 |

Figure 17:
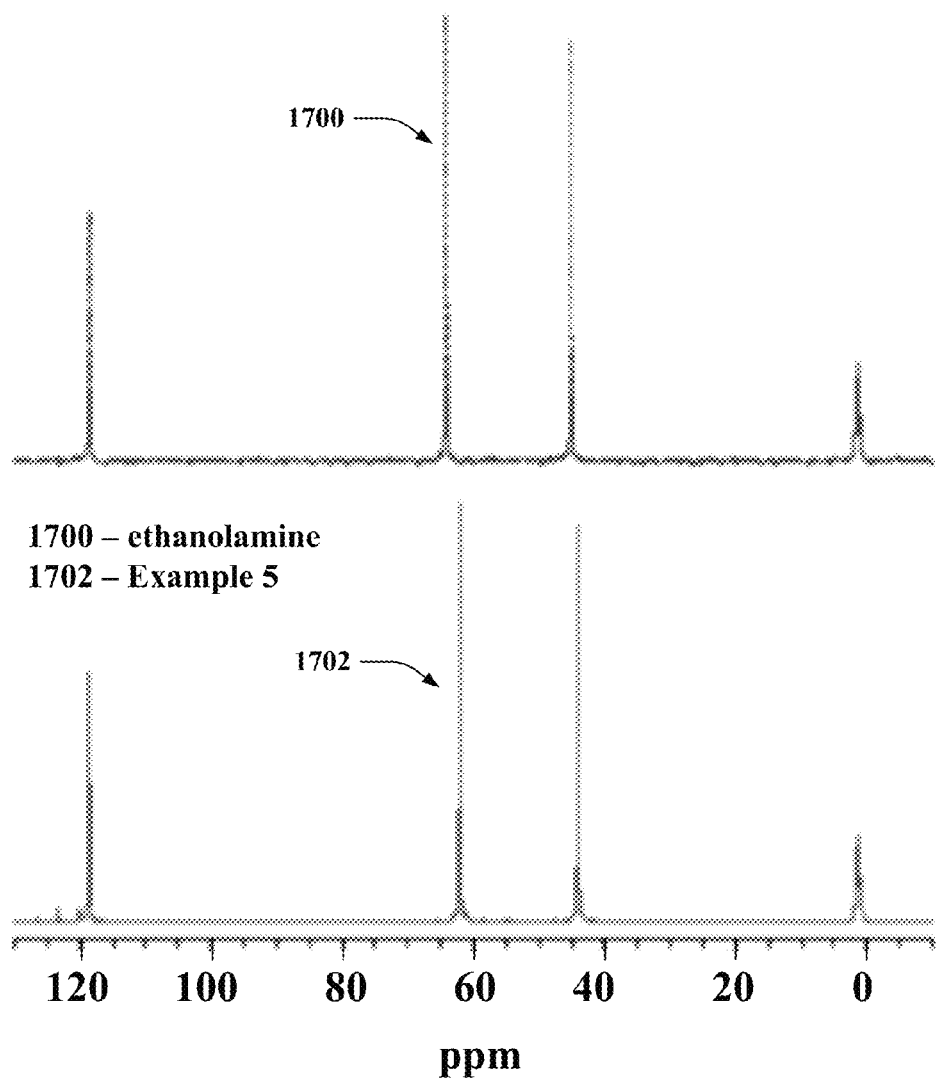
FIG. 17 illustrates solution $^{13}C$ NMR spectra of Example 5 and ethanolamine dissolved in $CD_3CN$.

FIG. 17 illustrates solution $^{13}$C NMR spectra of Example 5 (represented by line 1702) and EA (represented by line 1700) dissolved in CD$_3$CN (with the solvent as the internal reference). There were no changes in the UV-Vis spectrum of Example 5 (neat) and of Example 5 dissolved in CD$_3$CN, suggesting that CD$_3$CN was not coordinated to zinc. There were upfield shifts of 2.0 ppm and 1.0 ppm for the oxymethylene and aminomethylene groups, respectively, of Example 5 relative to EA alone. The larger shifts associated with the oxymethylene group in the $^{13}$C NMR spectra suggested coordination of the zinc was predominately through the hydroxyl moiety of EA, and this was consistent with the infrared data. The paramagnetic metal centers of Examples 2, 3A, 3B, 3C, and 4 prevented the acquisition of NMR on these compounds.

Physicochemical properties of the Examples 2, 3A, 3B, 3C, 4, and 5 as well as Example 1 are summarized in Table 2. Similar to Example 1, high optical absorbance of Examples 2, 3A, 3B, 3C, and 4 prevented direct acquisition of UV-Vis spectroscopic data. Therefore, Examples 2, 3A, 3B, 3C, and 4 were dissolved in 1-butyl-3-methyl-imidazolium hexafluorophosphate (BMI-PF6), and the resulting solutions were monitored by infrared difference spectra (subtraction of solvent peaks) to provide that PF$_6^-$ was not coordinating to the metal centers. Each compound displayed a single $\lambda_{max}$ (wavelength of maximum absorption) in the visible range attributable to d-d transitions with extinction coefficients (ε) that ranged from 31-244 M$^{-1}$ cm$^{-1}$. The UV-Vis spectrum of 5 (neat) revealed a single $\lambda_{max}$ at 312 nm.

TABLE 2

| Example | ε [M$^{-1}$ cm$^{-1}$] | $\lambda_{max}$ [nm] | μ [cP] | ρ [g mL$^{-1}$] | σ [MS cm$^{-1}$] | $E_a$ [kcal mol$^{-1}$] | $T_g$ [° C.] | $T_d$ [° C.] | $\chi_{calc}$ [BM] | $\chi_{meas}$ [BM] |
| --- | --- | --- | --- | --- | --- | --- | --- | --- | --- | --- |
| 1 | 63 | 477 | 4482 | 1.44 | 0.207 | 13.1 | −64 | 260 | 5.90 | 5.78 |
| 2 | 244 | 635 | 3383 | 1.14 | 0.045 | 12.2 | −63 | 190 | 1.73 | 1.50 |
| 3A | 31 | 648 | 12313 | 1.21 | 0.014 | 11.6 | −54 | 230 | 1.73 | 1.72 |
| 3B | 52 | 658 | 1295 | 1.30 | 0.067 | 11.2 | −65 | 240 | 1.73 | 1.72 |
| 3C | 96 | 643 | 13900 | 1.52 | 30.2 | 4.8 | −54 | 255 | 1.73 | 1.70 |
| 4 | 105 | 384 | 11671 | 1.19 | 624 | 1.1 | −52 | 215 | 5.92 | 5.63 |
| 5 | neat | 312 | 2533 | 1.38 | 0.341 | 14.6 | −84 | 155 | 0 | 0 |

Magnetic susceptibility measurements ($\chi_{meas}$) were used to confirm the oxidation state of the metals, and results of such measurements are summarized in Table 2. No oxidation state changes were observed upon coordinating the ligands to the metal center. Antiferromagnetic coupling was observed in Example 1 (iron compound) and Example 4 (manganese compound) at room temperature.

All of the compounds were viscous (at 25° C. and less than 2 ppm H$_2$O) with viscosity (μ) numbers falling over a wide range (1295-13900 cP, see Table 2). Although the cations of Examples 3A, 3B, and 3C each included a divalent copper center surrounded by six DEA ligands, the viscosity values span the highest and lowest numbers observed. Since Examples 3A, 3B, and 3C included different anions, it is shown that viscosity was strongly influenced by the nature of the anion. A comparison of viscosity of Examples 3A and 3C versus Example 3B suggested the cation also had significant influence. Examples 3A and 3C displayed preferential amine coordination leaving only hydroxyl groups in the secondary coordination sphere. In contrast, Example 3B displayed primarily hydroxyl coordination to the copper center, leaving both hydroxyl and amine groups in the secondary coordination sphere (see FIG. 3). As a result, the cation of Example 3B had lower symmetry than the cations of Examples 3A and 3C. Lower symmetry cations can lead to a decrease in ion pairing (and an increase in entropy) that in turn leads to lower viscosity. It is noted that this trend holds for the Examples set forth herein regardless of the metal. The Examples containing DEA ligands that displayed preferential hydroxyl coordination had an order of magnitude lower viscosity than those with amine coordination. Although both Example 1 and Example 3B had hydroxyl-coordinated DEA ligands, Example 1 had higher viscosity than Example 3B because it had trivalent iron whereas Example 3B had divalent copper and therefore lower charge density.

The specific conductivities of Examples 2, 3A, and 3B (at 25° C. and less than 2 ppm $H_2O$) were low (Table 2) and were an order of magnitude lower than Example 1, while Example 5 was about the same as Example 1. This was consistent with the viscosity of the compounds. Although Examples 3C and 4 were also viscous, they displayed two and three orders of magnitude improved conductivities, respectively. While this generally opposed the trend that lower viscosity leads to higher conductivity, aggregation and correlated ionic motions can lead to anomalies that are not easily predicted by modeling and simulation studies. The activation energies of conduction ($E_a$), measured from Arrhenius plots, ranged from 11.2-14.5 kcal mol$^{-1}$ for the Examples with low specific conductivity (Examples 1, 2, 3A, 3B, and 5) and 1.1-4.8 kcal mol$^{-1}$ for the Examples with high conductivity (Examples 3C and 4). These values were consistent with the fact that typical activation energy values for highly conductive aqueous and molten metal salts are ~3-5 kcal mol$^-$.

The stability of the Examples was evaluated by thermogravimetric analysis (TGA) and the onset temperature for decomposition ($T_d$) was measured. The results are reported in Table 2. Under identical conditions, the onset of mass loss for EA and DEA is 170° C. and 200° C., respectively. The $T_d$ values for the Examples reported in Table 2 were higher than the pure ligand, suggesting that the ligands were coordinated to the metal centers and the metal salts were not simply dissolved in either EA or DEA. Differential scanning calorimetry (DSC) was also used in order to determine melting ($T_m$) and/or glass transition ($T_g$) temperatures. Each of the Examples displayed a single $T_g$ below −50° C. that was indicative of an amorphous glass forming a liquid upon heating.

Figure 18:
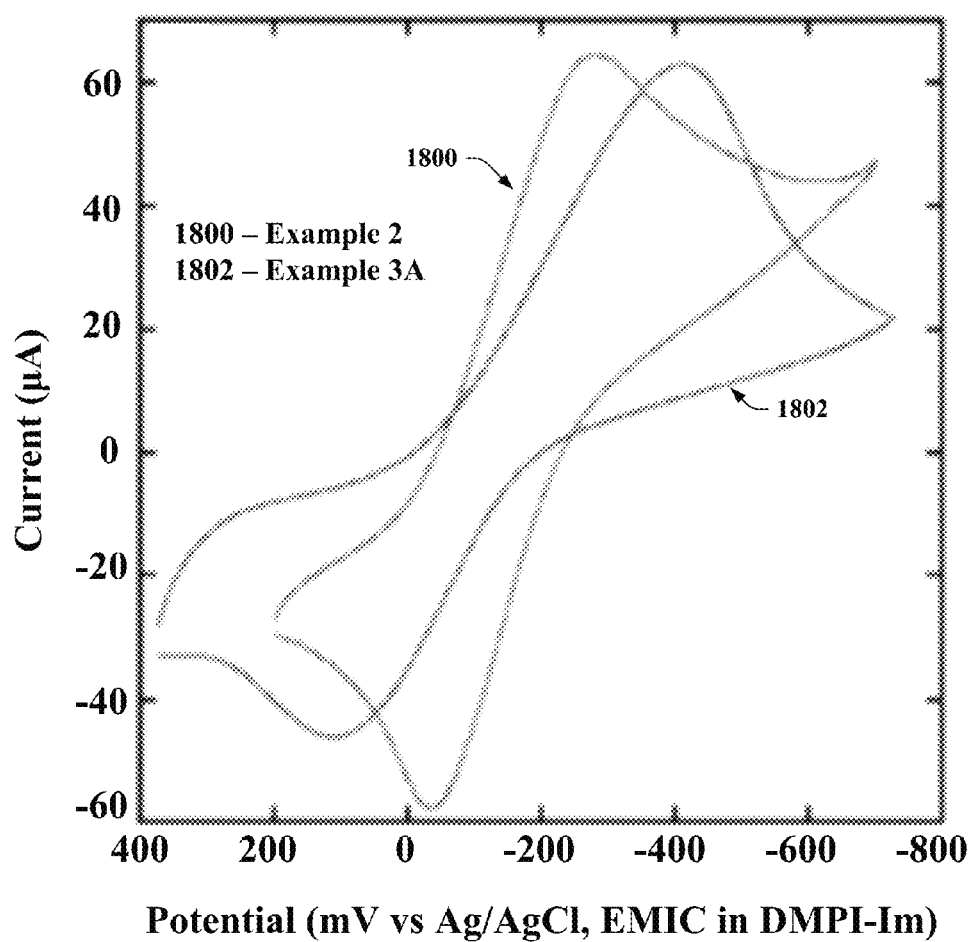
FIGS. 18-22 illustrate various cyclic voltammograms of the Examples.

FIGS. 18-22 depict various cyclic voltammograms (CVs) of the Examples and results are summarized in Table 3. FIG. 18 illustrates CVs of Example 2 (represented by line 1800) and Example 3A (represented by line 1802), performed on 0.1 M solutions in BMI-PF$_6$ with a glassy carbon (working) electrode (50 mV/s). Both Example 2 and Example 3A were formed from Cu[(2-Et)C$_5$COO]$_2$ and displayed a single quasi-reversible wave associated with Cu(II)/Cu(I) reduction and re-oxidation, but the EA ligands of Example 2 provided improved reversibility over Example 3A which instead contained DEA ligands. This result is likely indicative of differences in the kinetics associated with the coordination and disassociation of the two different ligands particularly since Cu(II) tends to adopt a six-coordinate tetragonal geometry whereas Cu(I) tends to be four-coordinate (tetrahedral).

Figure 19:
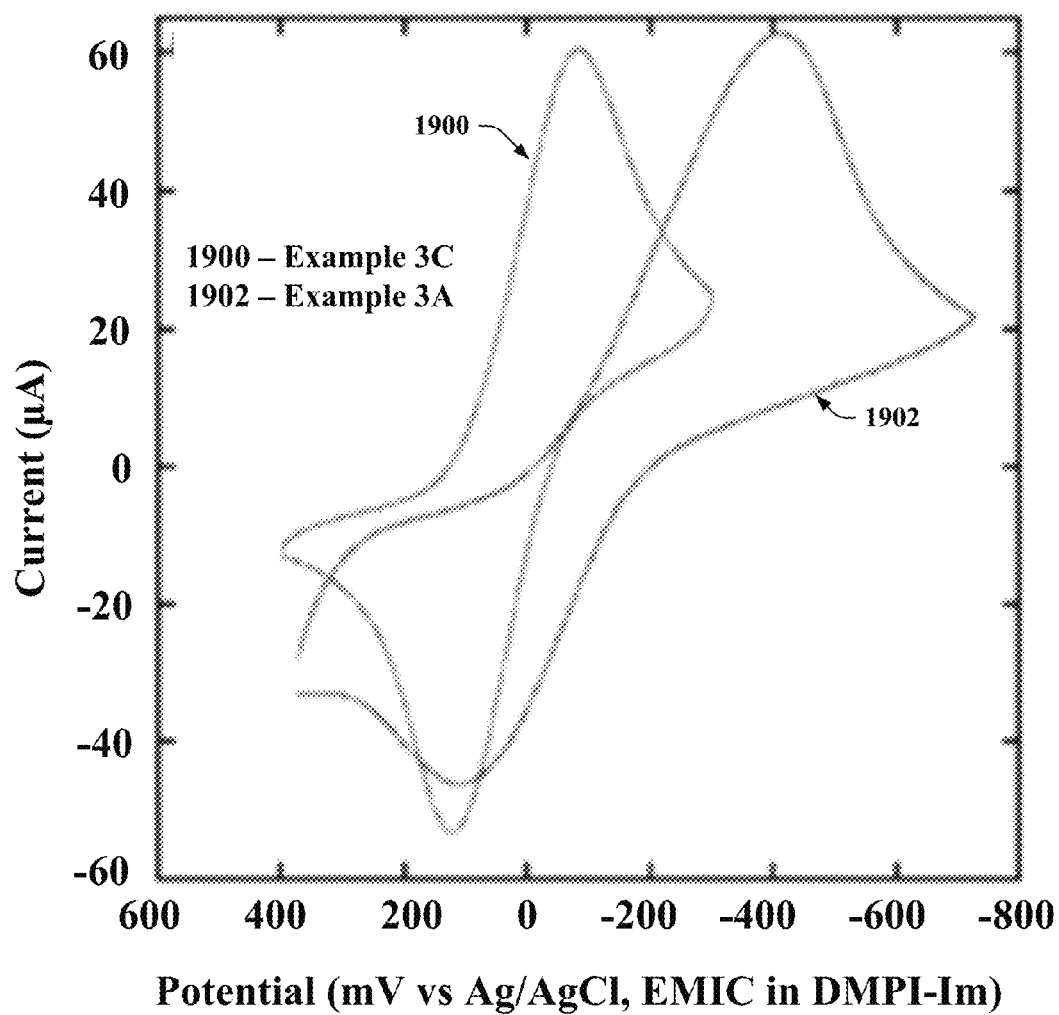

FIG. 19 shows CVs of Example 3A (represented by line 1902) and Example 3C (represented by line 1900) in BMI-PF$_6$ at a 50 mV/s scan rate and with a glassy carbon working electrode. Example 3A and Example 3C differed only in anion, and are shown under identical conditions in FIG. 19. The single quasi-reversible Cu(II)/Cu(I) wave observed in both complexes was less reversible in Example 3A as a result of a negative shift in the reduction peak. This was likely caused by increased ion pairing in [(2-Et)C$_5$COO]$^-$ (Example 3A) relative to [NTf$_2$]$^-$ (Example 3C).

Figure 20:
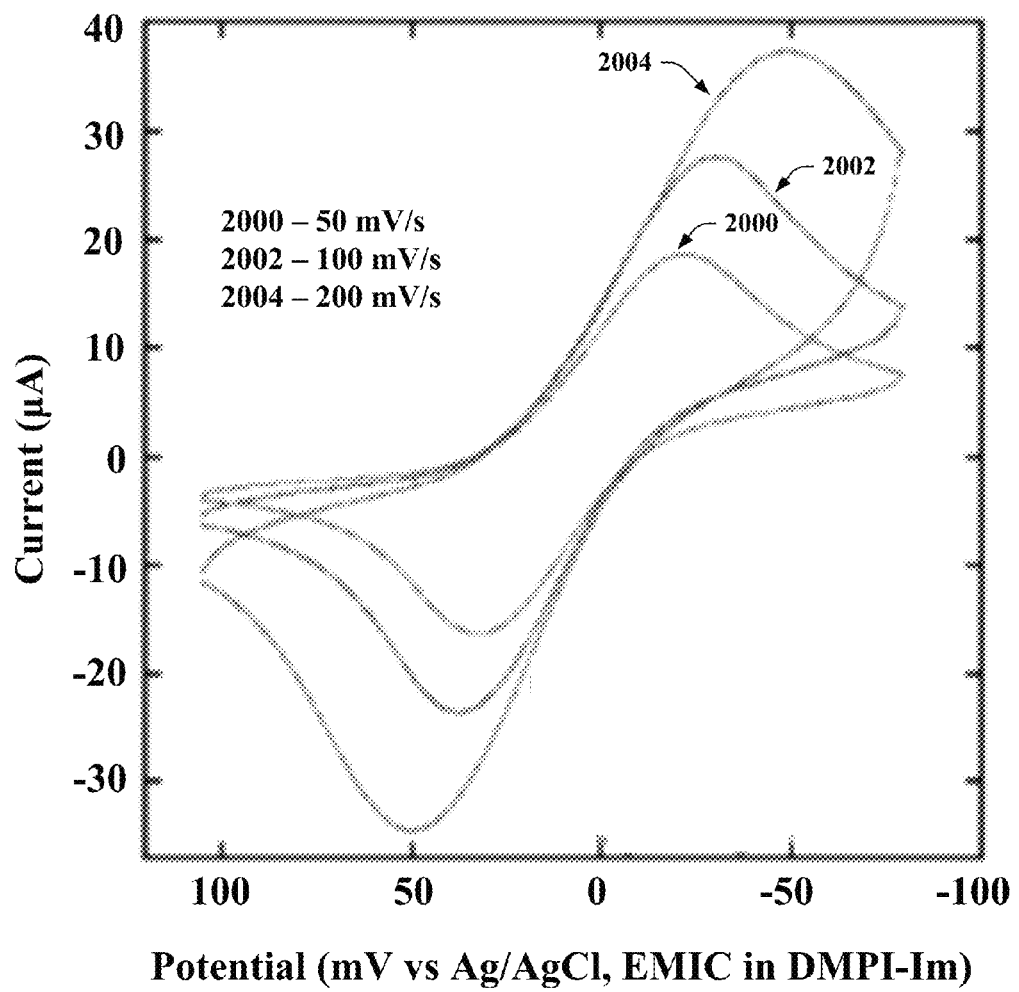

FIG. 20 illustrates CVs of Example 4 in BMI-PF$_6$ at three different scan rates with a glassy carbon working electrode. In FIG. 20, line 2000 represents a scan rate of 50 mV/s, line 2002 represents a scan rate of 100 mV/s, and line 2004 represents a scan rate of 200 mV/s. In contrast to the copper Examples (Examples 2, 3A, 3B, and 3C), the manganese-based Example 4 displayed a single reversible (at 50 mV/s scan rate) wave associated with Mn(II)/Mn(III) oxidation and re-reduction (line 2000). The currents increased approximately with the square root of the scan rate (up to 200 mV/s), suggesting the process was diffusive.

Figure 21:
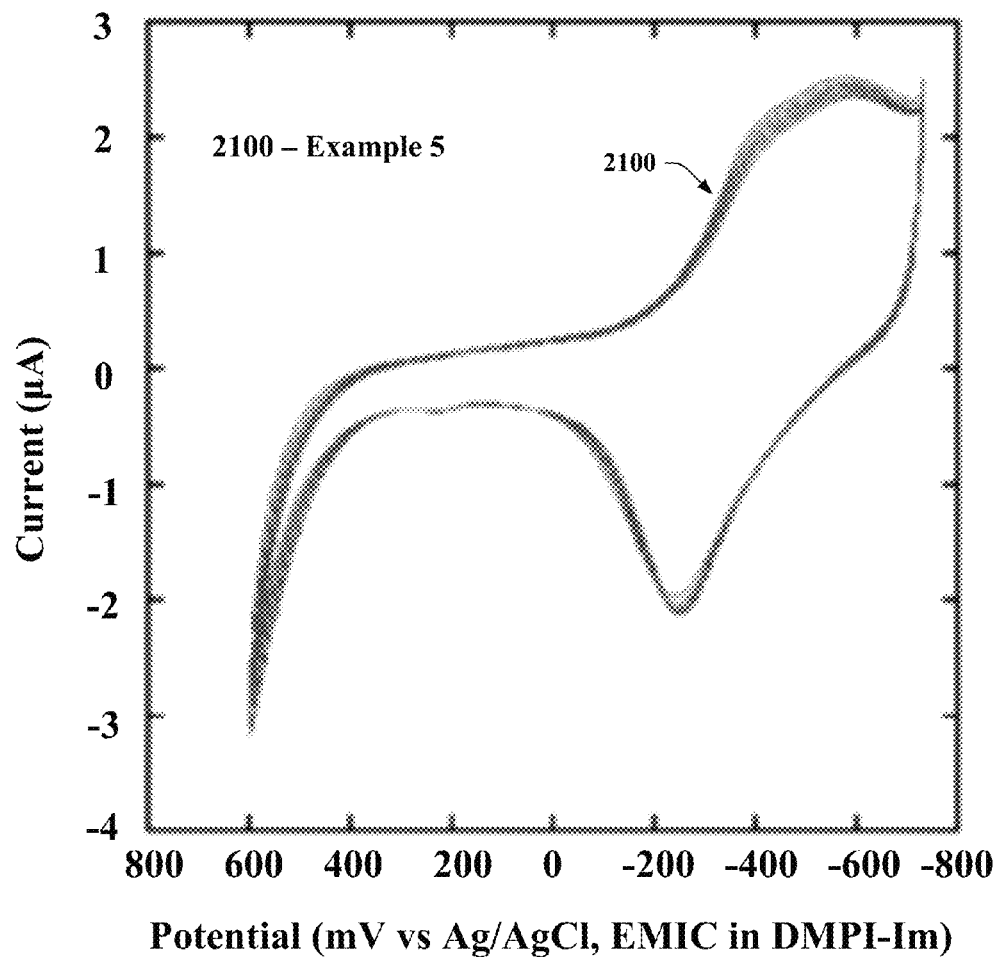
Figure 22:
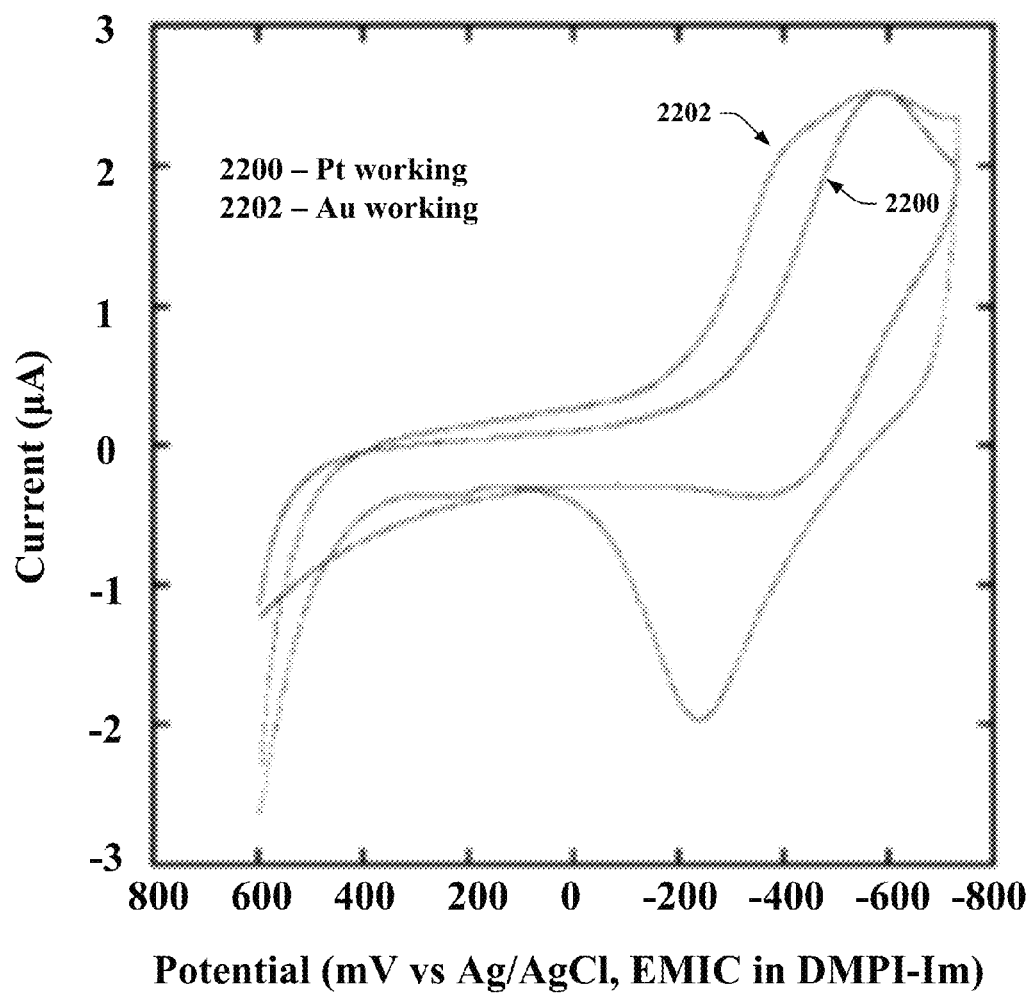

FIG. 21 depicts a CV of Example 5 (seven cycles, 0.01 M in BMI-PF$_6$, Au working electrode, 100 mV/s) at 2100. A single quasi-reversible wave associated with Zn(II)/Zn(0) reduction and stripping was observed. The two-electron process was confirmed by bulk electrolysis. It is noted that stripping was not observed with a Pt working electrode as illustrated in FIG. 22, suggesting that the surface chemistry of the working electrode influenced this process. FIG. 22 shows CVs of Example 5 in BMI-PF$_6$ at 100 mV/s with a Pt working electrode (represented by line 2200) and an Au working electrode (represented by line 2202).

TABLE 3

| Example | $E_{pc}$ (mV) | $E_{pa}$ (mV) | ΔE (mV) |
|---|---|---|---|
| 2 | −278 | −34 | 244 |
| 3A | −410 | 112 | 522 |
| 3B | −328 | 238 | 566 |
| 3C | −82 | 125 | 207 |
| 4 | −23 | 35 | 58 |
| 5 | −563 | −228 | 335 |

Generally, Examples 1, 2, 3A, 3B, 3C, 4, and 5 were metal-containing ionic liquids (MetILs) prepared by the reaction of metal salts (Fe[OTf]$_3$, Cu[(2-Et)C$_5$COO]2, Cu[OTf]$_2$, Mn[OTf]$_2$, or Zn[OTf]$_2$) with six equivalents of either EA or DEA. Single-step syntheses produced Examples 1, 2, 3A, 3B, 3C, 4, and 5. The results show that Examples 1, 2, 3A, 3B, 3C, 4, and 5 are members of a family of MetILs. Moreover, it has been demonstrated that select physicochemical properties can be systematically altered by the appropriate choice of ligand(s) and anion(s). The Examples set forth herein are viscous, but Examples 3C and 4 displayed orders of magnitude improvement in conductivity over Example 1, and Example 4 displayed reversible electrochemistry.

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A metal ionic liquid comprising:
a cation comprising a transition metal selected from the group consisting of Fe, Cu, Mn, Zn and combinations thereof and a ligand coordinated to the transition metal, wherein the ligand comprises an amine functional group and a hydroxyl functional group; and
an anion selected from the group consisting of 2-ethylhexanoate, hexafluorophosphate, triflate, triflimide, tetrafluoroborate and combinations thereof, the metal ionic liquid being a non-aqueous liquid.

2. The metal ionic liquid of claim 1, wherein the ligand is one of ethanolamine or diethanolamine.

3. The metal ionic liquid of claim 1, wherein the nitrogen containing functional group and the oxygen containing functional group have localized dipoles.

4. The metal ionic liquid of claim 3, wherein the localized dipoles produce an electronically asymmetric secondary coordination sphere of the cation that perturbs pairing with the anion.

5. The metal ionic liquid of claim 1, wherein the cation has an electronically asymmetric secondary coordination sphere that perturbs pairing with the anion.

6. The metal ionic liquid of claim 1, wherein the metal ionic liquid is an electroactive material and a solvent of at least one of a catholyte or an anolyte in a flow battery.

7. A redox flow battery; comprising:
a first electrode;
a second electrode; and
an anion exchange membrane that separates the first electrode and the second electrode;
wherein:
a first non-aqueous metal ionic liquid flows through the first electrode and a second non-aqueous metal ionic liquid, different from the first non-aqueous metal ionic liquid, flows through the second electrode;
the first non-aqueous metal ionic liquid further comprises an anion selected from the group consisting of 2-ethylhexanoate, hexafluorophosphate, triflate, triflimide, tetrafluoroborate and combinations thereof and a first cation selected from the group consisting of Fe, Cu, Mn, Zn and combinations thereof, wherein the first cation comprises a first ligand coordinated to a first transition metal, wherein the first ligand comprises an amine functional group and a hydroxyl functional group; and
the second non-aqueous metal ionic liquid further comprises the anion selected from the group consisting of 2-ethylhexanoate, hexafluorophosphate, triflate, triflimide, tetrafluoroborate and combinations thereof and a second cation selected from the group consisting of Fe, Cu, Mn, Zn and combinations thereof, wherein the second cation comprises a second ligand coordinated to a second transition metal, wherein the second ligand comprises an amine functional group and a hydroxyl functional group.

8. The redox flow battery of claim 7, wherein the nitrogen containing functional group is an amine functional group and the oxygen containing functional group is a hydroxyl functional group.

9. The redox flow battery of claim 7, wherein the first metal ionic liquid is an electroactive material and a solvent of a catholyte and the second metal ionic liquid is the electroactive material and the solvent of an anolyte in a flow battery.

* * * * *